(12) United States Patent
Donovan

(10) Patent No.: US 10,497,269 B2
(45) Date of Patent: Dec. 3, 2019

(54) INTEGRATED MANAGEMENT FOR AIRPORT TERMINAL AIRSPACE

(71) Applicant: Raytheon Company, Waltham, MA (US)

(72) Inventor: Timothy P. Donovan, Groton, MA (US)

(73) Assignee: Raytheon Company, Waltham, MA (US)

( * ) Notice: Subject to any disclaimer, the term of this patent is extended or adjusted under 35 U.S.C. 154(b) by 172 days.

(21) Appl. No.: 15/613,996

(22) Filed: Jun. 5, 2017

(65) Prior Publication Data

US 2017/0352281 A1    Dec. 7, 2017

Related U.S. Application Data

(60) Provisional application No. 62/345,462, filed on Jun. 3, 2016.

(51) Int. Cl.
*G06F 19/00*    (2018.01)
*G06F 7/70*     (2006.01)
(Continued)

(52) U.S. Cl.
CPC ............. *G08G 5/0043* (2013.01); *G06F 9/44* (2013.01); *G06Q 10/0631* (2013.01);
(Continued)

(58) Field of Classification Search
CPC .. G08G 5/0043; G08G 5/0026; G08G 5/0082; G08G 5/06; G08G 5/0017;
(Continued)

(56) References Cited

U.S. PATENT DOCUMENTS 6,278,965 B1   8/2001  Glass et al.
7,702,427 B1 * 4/2010  Sridhar ................. G08G 5/045
                                                701/14
(Continued)

FOREIGN PATENT DOCUMENTS

WO   2008061793 A1   5/2008
WO   2008063238 A2   5/2008
WO   2008105786 A2   9/2008

*Primary Examiner* — Mahmoud S Ismail
(74) *Attorney, Agent, or Firm* — Renner, Otto, Boisselle & Sklar, LLP

(57) ABSTRACT

A management software is provided for assisting air traffic control personnel with planning and monitoring aircraft departures and arrivals with regards to one or more airspaces, such as a terminal airspace predefined about an airport. Airspace output data structures are generated by an algorithm included in the management software and coded to a non-transitory computer-readable medium. A system for returning the airspace output data structures includes the management software, the medium, and a processor for executing computer code of the software. The airspace output data structures may include one or more of (a) modeled trajectories based in part on predetermined preferences provided by airline vendors, (b) adjusted departure times for departing aircraft, and (c) departing and arriving trajectory adjustments. A method of assisting personnel in managing aircraft includes the steps of modeling trajectories, comparing the trajectories, and adjusting departure times or trajectories to resolve proximity concerns between airborne aircraft.

23 Claims, 14 Drawing Sheets

(51) Int. Cl.
  *G06F 7/76* (2006.01)
  *G08G 5/00* (2006.01)
  *G06Q 50/30* (2012.01)
  *G06Q 10/06* (2012.01)
  *G08G 5/06* (2006.01)
  *G06F 9/44* (2018.01)

(52) U.S. Cl.
  CPC ........... *G06Q 50/30* (2013.01); *G08G 5/0026* (2013.01); *G08G 5/0082* (2013.01); *G08G 5/06* (2013.01)

(58) Field of Classification Search
  CPC .......... G08G 5/0039; G08G 5/00; G06F 9/44; G06Q 10/0631; G06Q 50/30; G05D 1/00
  USPC .......................................... 701/120, 121, 122
  See application file for complete search history.

(56) References Cited

U.S. PATENT DOCUMENTS

| | | |
|---|---|---|
| 7,747,382 B2 | 6/2010 | Small et al. |
| 7,813,871 B2 | 10/2010 | Small et al. |
| 8,473,126 B2 | 6/2013 | Dunsky |
| 8,554,457 B2 | 10/2013 | White et al. |
| 2009/0157288 A1* | 6/2009 | Bailey ................ G08G 5/0039 701/121 |
| 2014/0343833 A1* | 11/2014 | Baiada ............... G06Q 10/0631 701/122 |
| 2016/0093217 A1 | 3/2016 | Hale et al. |
| 2016/0210868 A1 | 7/2016 | Donovan |

* cited by examiner

INTEGRATED MANAGEMENT FOR AIRPORT TERMINAL AIRSPACE

RELATED APPLICATIONS INVENTION

The application claims the benefit of U.S. Provisional Application No. 62/345,462 filed Jun. 3, 2016, which is hereby incorporated herein by reference.

FIELD OF THE INVENTION

The present invention relates generally to software for management of aircraft in an airspace, and more particularly to software for managing trajectories of aircraft in an airspace.

DESCRIPTION OF THE RELATED ART

Air traffic management facilities often manage aircraft within a terminal airspace predefined about an airport in real time, providing instructions to aircraft on an as-need basis. For example, when an event occurs, air traffic control personnel at a management facility, for instance, may make a manual adjustment on an event-by-event basis. For example, an adjustment may be made to an aspect of a flight trajectory or an off-ground time of one or more aircraft to alleviate the congestion or conflict caused by the event. An event may include where an overabundance of aircraft are scheduled for departure from or arrival to an airport within a given time range, causing congestion at a location in the terminal airspace, such as at a departure fix. Another event may be where two or more aircraft are in too close of proximity to one another along respective trajectories, causing a conflict of trajectories. Yet another event may be weather related, where, a weather condition such as wind direction, wind speed, precipitation and visibility affects flight through the terminal airspace.

In view of such management of aircraft on an as-needed or even-by-event basis, peaks and valleys in air traffic develop causing often reoccurring, lengthy arrival and departure queues, which are often coupled with insufficient time for air traffic management facilities to adequately respond to reduce the queues. Inefficiencies are present, for example with respect to workload of traffic management, use of human resources, and use of aircraft fuel.

In some cases, standard operating procedures may further exacerbate such inefficiencies. One such example is where aircraft departing from and aircraft arriving to an airport are conventionally directed to level off at a given altitude during the respective climb or descent, until given clearance to proceed with further climb or descent by an air traffic controller at a management facility, causing often unnecessary fuel burn.

SUMMARY OF THE INVENTION

The present invention provides an airspace management software program for assisting air traffic control personnel in planning and monitoring aircraft departures and arrivals with regards to one or more airspaces, such as a terminal airspace predefined about an airport. Generally, the airspace program enables departing and arriving aircraft at an airspace to fly a modeled trajectory based on preferred inputs provided by an airline vendor. Using the modeled trajectories, the airspace program compares trajectories of departing and arriving aircraft within an airspace and provides outputs regarding adjustments to departure times and/or to departing or arriving trajectories.

More specifically, the airspace management software is configured to receive and manipulate data from such information and control facilities, and in response, to output one or more of (a) modeled trajectories based on input preferences provided by airline vendors, (b) adjusted departure times for departing aircraft, and (c) departure or arrival trajectory adjustments. The outputs may be provided as suggestions in reports, such as to the information and control facilities, or as automatic adjustments of said departure times along with reports of the same. To provide said outputs, the airspace management software may make one or more determinations of conformance/non-conformance of an aircraft to a modeled trajectory, of congestion at a fix of exit from/entry to the airspace, or of conflict in proximities of two or more aircraft to one another along respective modeled trajectories within the airspace.

A method of assisting personnel in managing aircraft includes the steps of modeling trajectories, comparing the trajectories, and adjusting departure times or trajectories to resolve proximity concerns between airborne aircraft. These steps may be performed by a processor running the airspace program.

According to one aspect of the invention, there is provided a method of assisting air traffic control personnel in managing a plurality of aircraft airborne within a predefined airspace within a predefined range of time. The method includes the step of (a) modeling a trajectory through the predefined airspace for each aircraft of a set of aircraft, each trajectory being defined between a surface of the predefined airspace and a fix on a periphery of the predefined airspace, and the set of aircraft including a plurality of aircraft departing from the surface of the predefined airspace or arriving into the predefined airspace within the predefined range of time. The modeling the trajectory includes identifying for each aircraft of the set of aircraft a set of inputs including an input fix and an input runway at the surface between which the respective aircraft travel, and an input horizontal flight path of the respective aircraft through the airspace. The modeling the trajectory also includes manipulating the set of inputs of each aircraft of the set of aircraft to provide modeled trajectories for each respective aircraft, and outputting the modeled trajectories. The method further includes steps of (b) identifying an input start time of at least two aircraft of the set of aircraft along the respective trajectories and calculating a modeled end time of the at least two aircraft of the set of aircraft along the respective trajectories, and (c) comparing the modeled trajectories of the at least two aircraft at the respective input start times and modeled end times. The method further includes the steps of (d) where a required separation between the at least two aircraft is not met, providing an adjustment, the adjustment being an adjusted modeled trajectory or adjusted input start time of one of the at least two aircraft to account for too close of a proximity of the at least two aircraft to one another at a time within the predefined range of time, and (e) repeating steps (a)-(d).

The set of inputs identified for each aircraft of the set of aircraft may include an additional input of an aircraft type of the respective aircraft.

The set of inputs identified for each aircraft of the set of aircraft may include an additional input of preferred climb or descent profile or preferred speed profile.

The additional input may be a predetermined preferred input provided by a respective airline vendor managing each respective aircraft of the set of aircraft.

The preferred climb or descent profile may not include a level off.

The providing an adjustment of step (d) may include providing to the air traffic control personnel the adjustment as a suggestion.

Where the adjustment is of a departure time, the providing an adjustment of step (d) may include providing to the one of the at least two aircraft, absent outside input from the air traffic control personnel, the adjustment being an actual adjustment.

The identifying an input start time of step (b) may include identifying either an off-ground time at which the respective aircraft becomes airborne from the runway or an arrival time at which the respective aircraft enters the airspace by crossing a fix.

The outputting the modeled trajectories may include where each respective modeled trajectory extends from the surface of the airspace at the respective runway to the respective fix.

The comparing the modeled trajectories of step (c) may include comparing the respective end times of at least two departing aircraft successively crossing the same respective fix, the departing aircraft being aircraft of the set of aircraft traveling from the surface of the airspace to the respective fix within the predefined range of time, and where a predefined required separation time or distance between the departing aircraft successively crossing the same fix is not met, the providing an adjustment of step (d) may include where the adjustment is an adjusted input start time being an adjusted off-ground time at which the respective departing aircraft becomes airborne from the respective runway.

The comparing the modeled trajectories of step (c) may include, for all departing aircraft departing from the surface of the predefined airspace within the predefined range of time, comparing the respective end times of each pair of departing aircraft successively crossing the same respective fix, and where the providing an adjustment of step (d) may include where the adjustment is an adjusted off-ground time of the departing aircraft that crosses the respective fix later or that has a later off-ground time of the respective pair of departing aircraft.

For each fix, the pairs of departing aircraft may be compared in an order of departing aircraft first crossing the respective fix to departing aircraft last crossing the respective fix within the predefined range of time.

The comparing the modeled trajectories of step (c) may include comparing respective positions of the at least two aircraft at a plurality of points along their respective trajectories, and where an adjustment may be provided where a predefined required separation time or distance between the at least two aircraft is not met at respective points along their respective trajectories.

Where the at least two aircraft include a departing aircraft, the providing an adjustment of step (d) may include where the adjustment is an adjusted input start time of the departing aircraft, the departing aircraft being an aircraft of the set of aircraft traveling from the surface of the airspace to the respective fix within the predefined range of time, and the adjusted input start time being an adjusted off-ground time at which the respective departing aircraft becomes airborne from the respective runway.

The comparing the modeled trajectories of step (c) may include comparing the respective positions along the respective trajectories of all departing aircraft departing from the surface of the predefined airspace within the predefined range of time with all arriving aircraft crossing a fix into the predefined airspace with the predefined range of time that are jointly airborne in the airspace at the same time within the predefined range of time.

The method may further include the step of comparing an actual trajectory of an aircraft of the set of aircraft for which a modeled trajectory was output, with the respective modeled trajectory of the aircraft.

According to another aspect of the invention, there is provided a method of assisting air traffic control personnel in managing a plurality of aircraft airborne within a predefined airspace within a predefined range of time. The method includes the step of (a) identifying for each aircraft of a set of aircraft a set of inputs including an input fix on a periphery of the predefined airspace and an input runway at a surface of the predefined airspace between which the respective aircraft travel, and an input horizontal flight path of the respective aircraft through the airspace, where the set of aircraft includes a plurality of aircraft departing from the surface of the predefined airspace or arriving into the predefined airspace within the predefined range of time. The method further includes the steps of (b) manipulating the set of inputs of each aircraft of the set of aircraft, (c) modeling respective modeled trajectories for each respective aircraft in view of the respective sets of inputs, each trajectory being defined from the respective runway to the respective fix, and (d) outputting the modeled trajectories.

The set of inputs identified for each aircraft of the set of aircraft may include an additional input of an aircraft type of the respective aircraft.

The set of inputs identified for each aircraft of the set of aircraft may include an additional input of predetermined preferred climb or descent profile or predetermined preferred speed profile provided by a respective airline vendor managing each respective aircraft of the set of aircraft.

According to yet another aspect of the invention, there is provided a method of assisting air traffic control personnel in managing a plurality of aircraft airborne within a predefined airspace within a predefined range of time. The method includes the step of (a) modelling and outputting a trajectory through the predefined airspace for each aircraft of a set of departing aircraft, each trajectory being defined between the surface of the predefined airspace and a fix on a periphery of the predefined airspace, and the set of departing aircraft including a plurality of aircraft departing from the surface of the predefined airspace within the predefined range of time. The method further includes the step of (b) identifying an input off-ground time of at least two departing aircraft of the set of departing aircraft along the respective trajectories and calculating a modeled fix crossing time of the at least two departing aircraft of the set of departing aircraft along the respective trajectories. The method further includes the steps of (c) comparing the modeled trajectories of the at least two departing aircraft at the respective input off-ground times and modeled fix crossing times, (d) where a predefined required separation time or distance between the departing aircraft is not met where at least one of the at least two departing aircraft is at the respective crossing fix along its respective modeled trajectory, providing a suggested or actual adjustment of the respective off-ground time of another of the at least two departing aircraft for which the required separation time or distance was not met between the at least one and the another of the at least two departing aircraft, and (e) repeating steps (a)-(d).

According to another aspect of the invention, a computer-readable medium is provided being non-transitory and having processor-executable instructions implementable to manage one or more of a plurality of aircraft airborne within an airspace within a predefined range of time. The instructions include (a) identifying a set of departing aircraft that will be airborne in the airspace within the predefined range of time; (b) for each of the plurality of departing aircraft, plotting in three-dimensional space a modeled trajectory through the airspace between a surface of the airspace and a fix boundary at a perimeter of the airspace, where the modeled trajectory is based on predetermined preferences of one or more of climb profile and a speed profile of the respective aircraft; (c) identifying a set of fixes at the fix boundary of the airspace through which the plurality of departing aircraft cross; (d) for each fix of the set of fixes, determining separation distances or times between each pair of departing aircraft crossing out of the airspace in succession; (e) outputting one or more congestion alerts each identifying an instance where the required minimum separation distances or times are not met between a pair of departing aircraft; (f) outputting for each congestion alert an adjusted departure time of one or more aircraft of the plurality of departing aircraft, the adjusted departure time allowing the required minimum separation distances or times between the pair of aircraft to be met; and (g) repeating steps (a) through (f) a predefined interval of time after initiation of the previous running of steps (a) through (f).

The computer-readable medium may have further processor-executable instructions including identifying a set of arriving aircraft that will be airborne in the airspace within the predefined range of time; and for each of the plurality of arriving aircraft, plotting in three-dimensional space a modeled trajectory through the airspace between a surface of the airspace and a fix boundary at a perimeter of the airspace, where the modeled trajectory is based on predetermined preferences of one or more of climb profile and a speed profile of the respective aircraft, the predetermined preferences provided by an airline vendor operating the respective aircraft.

The computer-readable medium may have further processor-executable instructions including for each aircraft of the plurality of departing aircraft and the plurality of arriving aircraft: receiving data regarding the actual location in the airspace of each aircraft, comparing the modeled trajectory of each aircraft to its actual location, determining a calculated horizontal and vertical deviation of the each aircraft from its respective modeled trajectory, identifying a maximum allowable horizontal and vertical deviation, determining if the calculated horizontal deviation or calculated vertical deviation is respectfully greater than the maximum allowable horizontal deviation and maximum allowable vertical deviation, and where the maximum allowable horizontal deviation or maximum allowable vertical deviation is exceeded, adjusting a remainder of the modeled trajectory not yet traveled of the respective aircraft to account for the horizontal or vertical deviation.

The computer-readable medium may have further processor-executable instructions including comparing the modeled trajectory of each departing aircraft of the plurality of departing aircraft with the modeled trajectory of each arriving aircraft of the plurality of arriving aircraft to determine if, when the respective aircraft are airborne, based on their respective timing schedules for travel through the airspace, the minimum separation distances or times are not met between each departing aircraft and each arriving aircraft at one or more points along the trajectory of each departing aircraft, identifying conflicts where the minimum separation distances or times requirement are not met, and for each conflict, adjusting the departure time of one or more aircraft of the plurality of departing aircraft, the adjusted departure time allowing the required minimum separation distances or times between the respective aircraft to be met.

The computer-readable medium may have further processor-executable instructions including comparing the modeled trajectory of each departing aircraft of the plurality of departing aircraft with the modeled trajectory of the other of the departing aircraft of the plurality of departing aircraft to determine if, when the respective aircraft are airborne, based on their respective timing schedules for travel through the airspace, the minimum separation distances or times are not met between each departing aircraft and each other departing aircraft at one or more points along the trajectory of the each departing aircraft, identifying conflicts where the minimum separation distances or times requirement are not met, and for each conflict, adjusting the departure time of one or more aircraft of the plurality of departing aircraft, the adjusted departure time allowing the required minimum separation distances or times between the respective aircraft to be met.

The computer-readable medium may have further processor-executable instructions including comparing the modeled trajectory of each arriving aircraft of the plurality of arriving aircraft with the modeled trajectory of the other of the arriving aircraft of the plurality of departing aircraft to determine if, when the respective aircraft are airborne, based on their respective timing schedules for travel through the airspace, the minimum separation distances or times are not met between each arriving aircraft and each other arriving aircraft at each point along the trajectory of the each arriving aircraft, identifying conflicts where the minimum separation distances or times requirement are not met, and for each conflict, adjusting one or more aspects of the modeled trajectory of one or more aircraft of the plurality of arriving aircraft, the adjusted modeled trajectories allowing the required minimum separation distances or times between the respective aircraft to be met, where the aspects of the modeled trajectory include climb profile and speed profile.

Adjusting a climb profile of the modeled trajectory of one or more aircraft of the plurality of arriving aircraft may include adding one or more level offs to the climb profile.

The outputting for each congestion alert an adjusted departure time of one or more aircraft of the plurality of departing aircraft of step (f) may include adjusting the departure times of the one or more aircraft of the plurality of departing aircraft such that a departure order of the one or more aircraft of the plurality of departing aircraft is maintained.

The plotting in three-dimensional space a modeled trajectory through the airspace between a surface of the airspace and a fix boundary at a perimeter of the airspace of step (b) may include plotting the modeled trajectory based on a climb profile preference that omits level offs.

The plotting in three-dimensional space a modeled trajectory through the airspace between a surface of the airspace and a fix boundary at a perimeter of the airspace of step (b) may include plotting the modeled trajectory based on separate predetermined preferences for different types of aircraft.

The plotting in three-dimensional space a modeled trajectory through the airspace between a surface of the airspace and a fix boundary at a perimeter of the airspace of step (b) may include plotting the modeled trajectory based on separate predetermined preferences for different runways within the airspace.

The plotting in three-dimensional space a modeled trajectory through the airspace between a surface of the airspace and a fix boundary at a perimeter of the airspace of step (b) may include plotting the modeled trajectory based on separate predetermined preferences for different fix points of entry/exit through the fix boundary.

The computer-readable medium, where for step (a), the predetermined range of time may be two hours.

The computer-readable medium, where the instructions may further include outputting a report of the congestion alerts.

A system for managing a plurality of aircraft airborne within an airspace within a predefined range of time, the system may include an airspace management software program including the processor-executable instructions, the computer-readable medium capable of storing thereon the airspace management software program, and a processor for executing the processor-executable instructions of the software.

According to still another aspect of the invention, a computer-readable medium is provided being non-transitory and having processor-executable instructions implementable to manage one or more of a plurality of aircraft airborne within an airspace within a predefined range of time. The instructions include (a) identifying a set of departing aircraft that will depart from and be airborne in the airspace within the predefined range of time; and (b) for each of the plurality of departing aircraft, plotting in three-dimensional space a modeled trajectory through the airspace between a surface of the airspace and a fix boundary at a perimeter of the airspace, where the modeled trajectory is based on predetermined preferences of one or more of climb profile and a speed profile of the respective aircraft.

The instructions may further include outputting a report including parameters of each of the modeled trajectories.

The computer-readable medium where none of the modeled paths plotted in step (b) may include a level off.

The computer-readable medium where the instructions may further include (c) identifying a set of arriving aircraft that will arrive at and be airborne in the airspace within the predefined range of time; and (d) for each of the plurality of arriving aircraft, plotting in three-dimensional space a modeled trajectory through the airspace between a surface of the airspace and a fix boundary at a perimeter of the airspace, where the modeled trajectory is based on predetermined preferences of one or more of climb profile and a speed profile of the respective aircraft.

According to yet another aspect of the invention, a computer-readable medium is provided being non-transitory and having processor-executable instructions implementable to manage one or more of a plurality of aircraft airborne within an airspace within a predefined range of time, the instructions comprising: (a) identifying a set of aircraft departing from or arriving to the airspace within the predefined range of time; (b) receiving a first data structure including predetermined preferences for a trajectory through the airspace of each aircraft of the set of aircraft; (c) receiving a second data structure including a list of available fixes of entry/exit from the airspace; (d) manipulating data from each of the first and second data structures to generate a modeled trajectory through the airspace for each aircraft of the set of aircraft, such that each modeled trajectory extends through one of the available fixes of entry/exit, and includes a majority of the predetermined preferences provided in the first data structure; and (e) outputting a data structure including a compilation of each of the modeled trajectories, where the predetermined preferences provided in the first data structure include one or more of aircraft speed profile and aircraft climb profile.

To the accomplishment of the foregoing and related ends, the invention comprises the features herein after fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The integrated airspace management software program is configured for storage in a non-transitory computer-readable medium and is configured to function in conjunction with one or more air traffic information and control facilities, also herein referred to as information and control facilities or management facilities for the sake of brevity. The airspace management software program, also herein referred to as the software program or airspace program, assists a user, such as air traffic control personnel, for example, with planning and monitoring aircraft departures and arrivals with regards to one or more airspaces, such as a terminal airspace predefined about one or more predetermined locations such as an airport. As used herein, air traffic control personnel refer to any user of the airspace program, who may or may not control or manage aircraft from a management facility.

Generally, the airspace program models trajectories based on a number of inputs including preferred speed and climb/descent profiles provided by an airline vendor, enabling departing and arriving aircraft at an airspace to take the modeled trajectories. The airspace program compares the modeled trajectories of departing and arriving aircraft within an airspace and provides outputs regarding departure times and/or departing or arriving trajectories.

More specifically, the airspace management software is configured to receive and manipulate data from such information and control facilities, and in response, to output one or more of (a) modeled trajectories based on predetermined preferences provided by airline vendors, (b) adjusted departure times for departing aircraft, and (c) departure or arrival trajectory adjustments. The outputs may be provided as suggestions in reports, such as to the information and control facilities, or as automatic adjustments of said departure times along with reports of the same. To provide said outputs, the airspace management software may make one or more determinations of conformance/non-conformance of an aircraft to a its respective modeled trajectory, congestion at a fix of exit/entry from/to the airspace, and conflict in proximities of two or more aircraft to one another along respective trajectories within the airspace.

While the description detailed herein is described in conjunction with a three-dimensional terminal airspace surrounding a commercial airport, the software program herein described may be also utilized for management of an airspace of any suitable size or shape, or of an airspace surrounding any location such as other aircraft facilities, protected landmarks, areas requiring securely controlled airspace, etc. The airspace software program may additionally or alternatively be used with numerous types of aircraft, such as commercial planes, cargo planes, fighter jets, other manned planes, helicopters, UAV's (unmanned aerial vehicles), etc.

Figure 1:
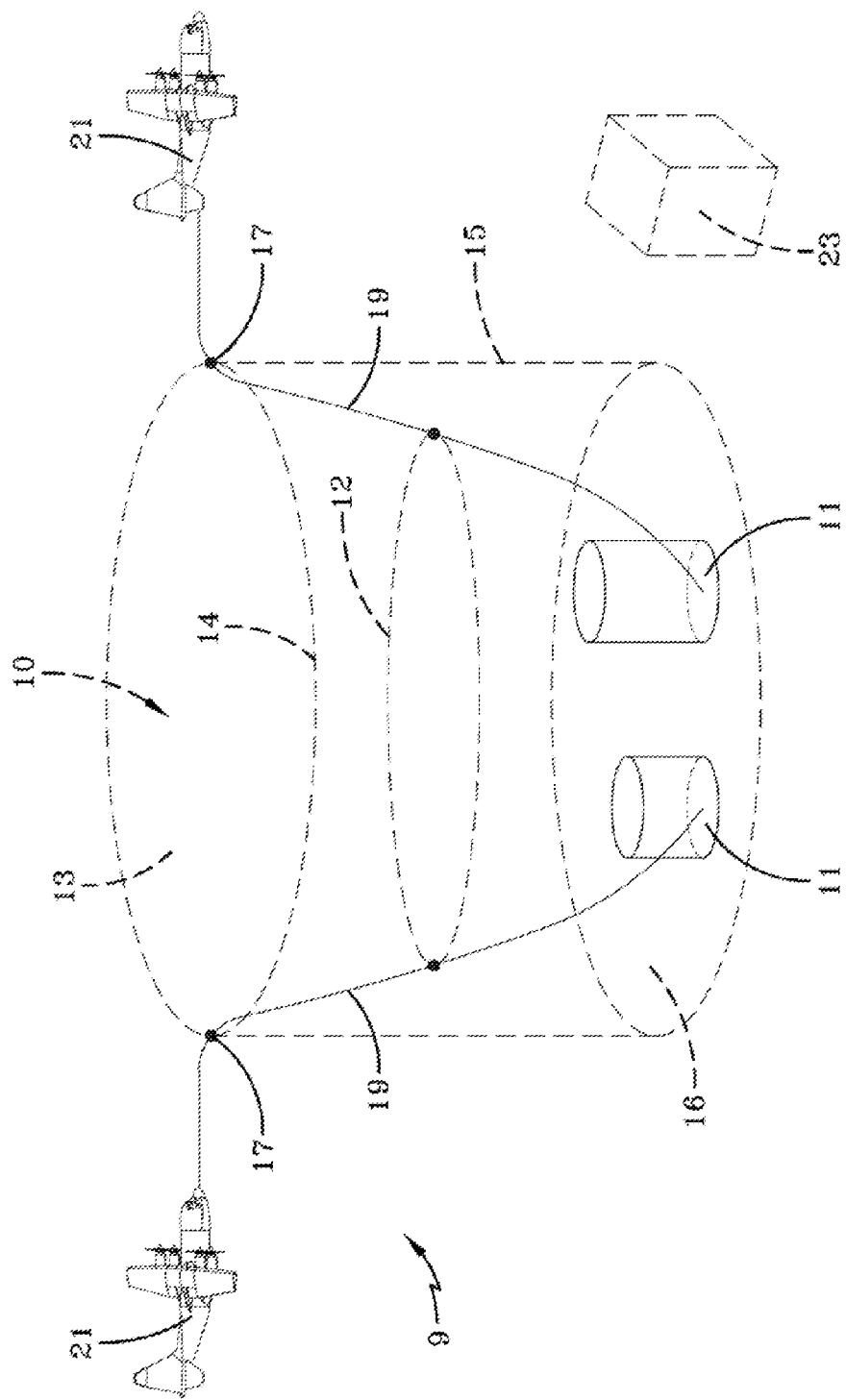
FIG. 1 is a schematic representation of an airspace managed by an air traffic management system according to the present invention.
Figure 2:
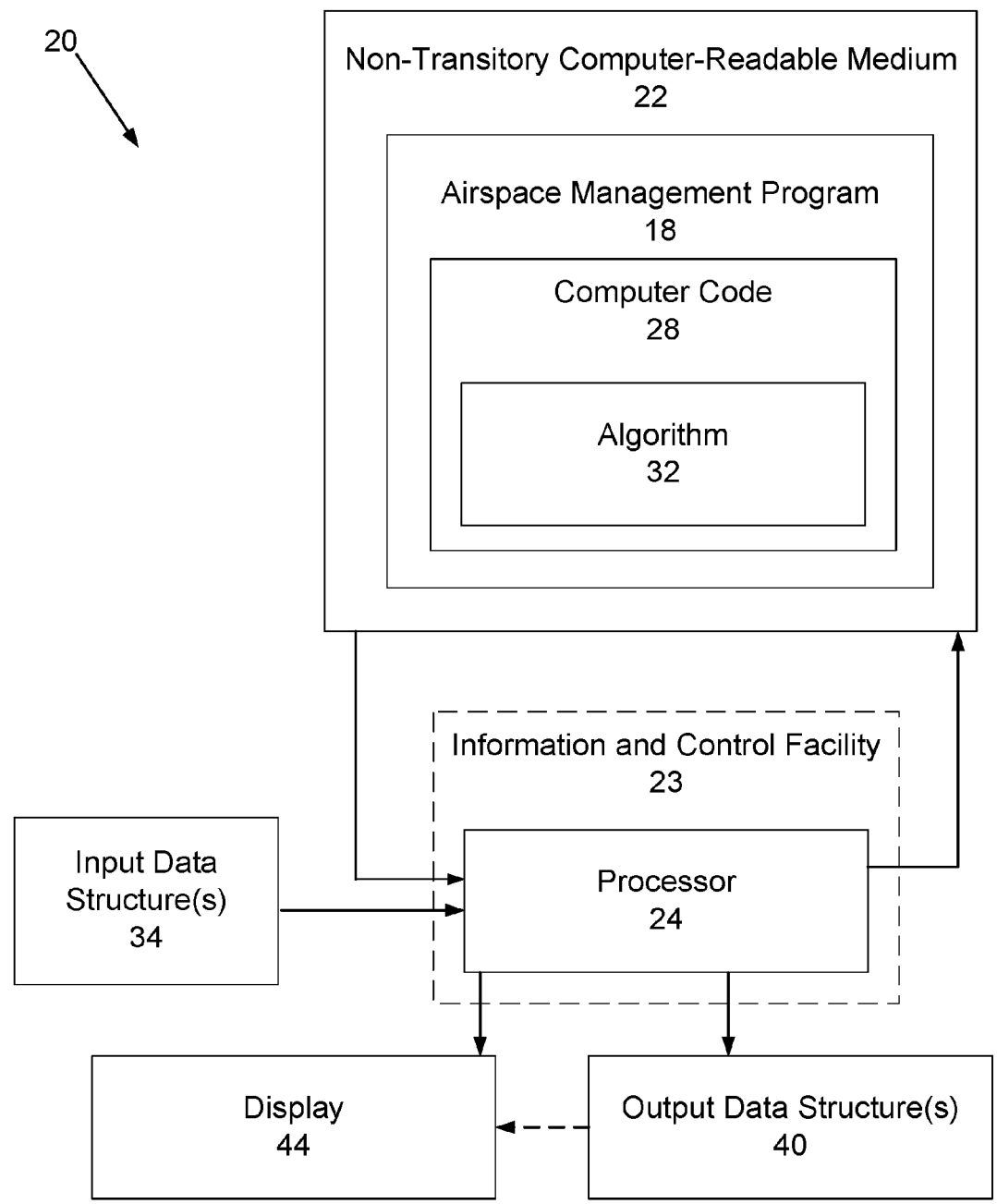
FIG. 2 is a schematic representation of a part of an air traffic management system according to the present invention.
Figure 3:
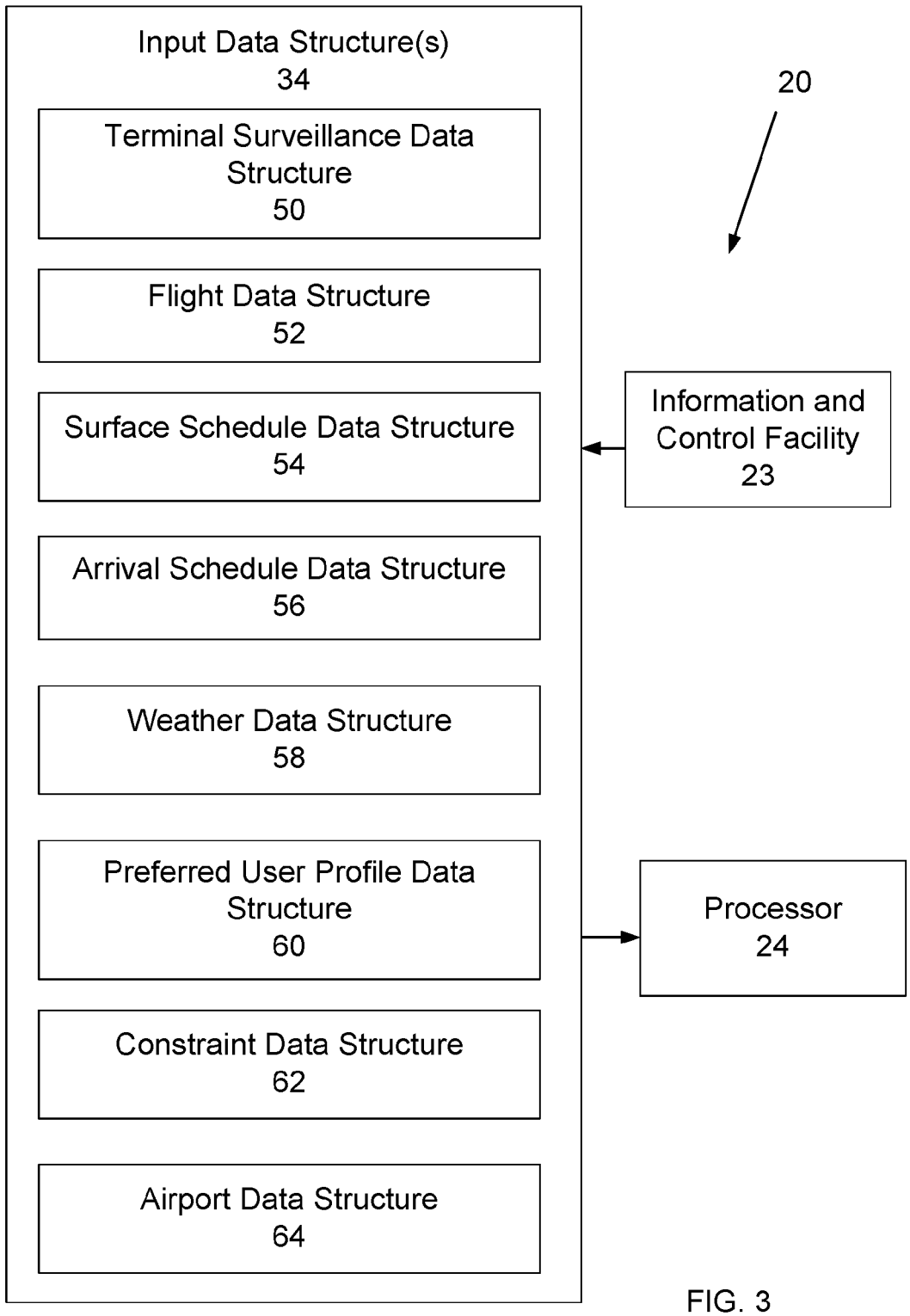
FIG. 3 is a schematic representation of another part of an air traffic management system according to the present invention.
Figure 4:
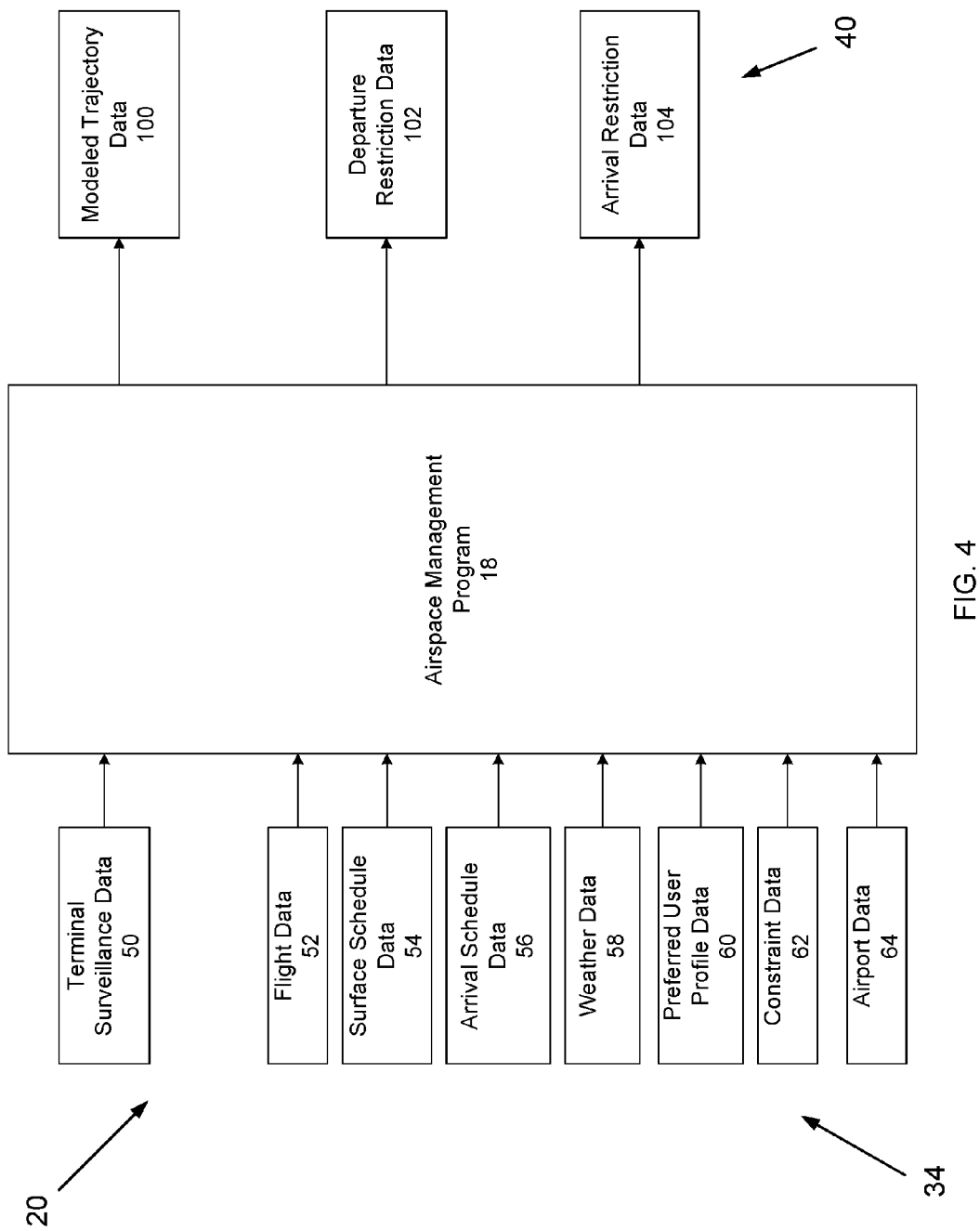
FIG. 4 is a schematic representation of yet another part of an air traffic management system according to the present invention.

Turning first to FIG. 1 an exemplary airspace 10, such as a terminal airspace, is shown over one or more predetermined locations 11, such as an airport 11. The terminal airspace 10 may include a waypoint boundary 12, and is defined by a ceiling 13, a fix boundary 14, and a vertically extending boundary 15. An enroute airspace 9 surrounds each side of the airspace 10 other than a side of the airspace 10 at a surface 16. In other embodiments, the airspace 10 may be of any suitable shape, may have more than one fix boundary, and/or may surround more than one predetermined location.

The surface 16 has a plurality of runways associated with the one or more airports 11. A runway may be defined as any path along the surface 16 having a takeoff or off-ground point at which an aircraft 21 becomes airborne into the airspace 10 and leaves the surface 16 at a departure time (takeoff time or push time or off-ground time or release time).

The ceiling 13 is depicted as a flat plane that is generally parallel to the surface 16. The ceiling 13 is provided at a given altitude, such as at a distance between about 10,000 feet to about 20,000 feet from the surface, or at about 15,000 feet, for example. It will be appreciated that the ceiling may be provided at any suitable height and may vary depending on the predetermined location over which a respective airspace is defined. In some embodiments, the ceiling may not be a flat plane and may instead include points of varying distance from the surface 16.

The ceiling 13 is bounded by the fix boundary 14. The fix boundary 14, also herein referred to as the horizontal boundary 14, is at a periphery of the ceiling 13 and is a line along which aircraft 21 are conventionally directed to exit and enter the airspace 10. For example, numerous predefined fixes 17 may be identified as points along the fix boundary 14. Identification of fixes 17 allows air traffic entering and exiting the airspace 11 to be precisely controlled by requiring aircraft 21 to fly generally to and through these specific fixes 17. Conventionally, the fix boundary 14 is a circle having about a 40 mile to about a 60 mile radius, such as about a 50 mile radius, and which may or may not be centered over the predetermined location. Certainly, the fix boundary 14 may be of another suitable shape, having varying distances across the fix boundary 14, or having a different radius in other embodiments.

The intermediate fix boundary or waypoint boundary 12 may provide waypoint locations (not labeled) between the surface 16 and the fix boundary 14 through which aircraft 21 may be required to traverse. The waypoint boundary 12 is shown as a single line in the shape a circle, spaced from each of the surface 16, ceiling 13, fix boundary 14 and vertically extending boundary 15. One or more waypoints (waypoint locations) may be provided. Via use of the waypoint boundary 12, traffic control may be able to further shape trajectories 19 or redirect trajectories through points along the waypoint boundary 12 where necessary.

Extending between the fix boundary 14/ceiling 13 and the surface 16 is the vertically extending boundary 15. Conventionally, the vertically extending boundary 15 extends directly downwardly, is a plane extending around the predetermined location 11, and is generally orthogonally aligned with respect to the ceiling 13. Thus, the terminal airspace 10 generally resembles a cylinder. The vertically extending boundary 15 may be otherwise suitably shaped in other embodiments.

Trajectories 19 of aircraft through the terminal airspace 10 are conventionally controlled by a Terminal Radar Approach Control (TRACON) facility 23. These facilities 23 are often regional and control one or more airports 11. Where a TRACON controls multiple airports, outlying airports may be located within a predetermined distance of a primary airport controlled by the TRACON. Terminal controllers at the TRACON manage the terminal airspace. These terminal controllers provide radar separation and advisory services to aircraft within the terminal airspace, sequence arrivals for approach to the airport, and sequence departures from the airport for transition to the enroute airspace surrounding the terminal airspace using altitude, speed and heading clearances, for instance. TRACON control ends for departing aircraft 21 before a fix 17 in the terminal airspace 10, as responsibility for control is then handed off to another management facility 23. Likewise, TRACON control begins for arriving aircraft 21 before a fix 17 in the enroute airspace 9, as control is handed off from another management facility 23 to the respective TRACON.

This control is provided in part to maintain separation of aircraft 21 in the terminal airspace 10. As used herein, separation may be defined in terms of distance or time. For example, aircraft 21 within a particular vertical altitude of one another must maintain a particular horizontal separation. For example, aircraft within about 1,000 feet of one another vertically may be required to maintain horizontal separation of about 3 miles or more. This requirement may only be applicable above a particular altitude, such as about 5,000 feet for example.

Another requirement may be a miles-in-trail (MIT) separation requirement. At a specific fix 17, aircraft 21 may be required to maintain a separation distance of about 3 miles to about 7 miles from one another, such as about 5 miles from one another. In some cases, a miles-in-trail requirement may be much larger, such as about 10 miles to about 30 miles, such as about 20 miles. Alternatively, a MIT separation requirement may be provided in terms of minutes between aircraft 21 travelling at similar speeds, such as about two minutes between aircraft 21. Similar speeds may be defined as speeds within a predetermined differential of one another, such as about 5 miles per hour, for example.

Conventional control of aircraft 21 in the terminal airspace 10, such as by the TRACON 23, involves considerable "manual" instruction of departing and arriving aircraft. As used herein, manual refers to decisions made by personnel, such as at an information and control facility. On the other hand, "automatic" refers to decisions made via computer, such as via an output from a software program running on a processor at an air traffic information and control facility. Departing aircraft 21 are those that are initially on the surface 16 and will takeoff from a runway of the airport 11, following a trajectory 19 through the terminal airspace 10, towards a departure fix 17 on the fix boundary 14, and possibly through a waypoint of the waypoint boundary 12. Arriving aircraft 21 are those that enter the airspace 10 from the enroute airspace 9, following a trajectory 19 through the terminal airspace 10 from an arrival fix 17 and possibly through a waypoint, towards the surface 16.

Thus, a trajectory 19 through the terminal airspace 10 extends between the surface 16 and a respective arrival/departure fix 17 on the fix boundary 14, and preferably from the surface 16 to the fix 17. A fix boundary 14 conventionally includes a plurality of fixes 17, of which a subset is used for departures and a separate subset is used for arrivals. A trajectory 19 is defined as a path through three-dimensional space and includes aspects of a climb profile, speed profile, and a horizontal flight path. A trajectory 19 is typically defined between a start point and an end point each having a respective timing associated therewith. Each trajectory 19 may include one or more flight segments, each of which starts at a start vertex and ends at an end vertex, which is often integral with the start vertex of a next segment. Each vertex includes a respective latitude and longitude.

Conventional control operations of aircraft 21 along their respective trajectories 19 often are based on a "first come, first served" requirement. For example, departure times from the surface 16 are provided on a departure schedule from one information and control facility 23 to another, such as to an airline vendor. As used herein an airline vendor is the controlling entity of an aircraft, which may be an airline itself, a person, or any other entity managing aspects of business of the aircraft. Also, as used herein, a departure time may be referred to as a takeoff time, push time, or off-ground time at which a departing aircraft 21 leaves the surface 16.

A departure schedule may provide departure times for aircraft departing from more than one airport where multiple airports are within a terminal airspace. Where departing aircraft taking off from different airspaces (or from different airports within the terminal airspace 10) will reach a departure fix 17 within a particular time of one another, causing congestion at the fix 17, the departure times may be correspondingly metered. Instructions may be manually issued, such as by the TRACON, for the aircraft with the later initial departure time from the surface 16 to hold at the terminal for a specified amount of time, thus providing a later adjusted departure time to that aircraft.

Other conventional control operations include required level offs for both departing aircraft 21 and arriving aircraft 21. Typically, all departing aircraft 21 leaving the surface 16 are required to level off at a particular altitude after an initial climb. The departing level off altitude may be at about 5,000 feet for example. Likewise, all arriving aircraft 21 entering the terminal airspace 10 from the enroute airspace 9 are required to level off at a particular altitude after an initial descent. The arriving level off altitude may be at about 6,000 feet for example.

A trajectory of a departing aircraft or an arriving aircraft within the terminal airspace 10 typically may also include more than one level off due to occurrence of a proximity conflict of aircraft 21 along respective trajectories 19, for example. The additional level offs may enable separation distance to be obtained vertically, horizontally (laterally), or both between two or more aircraft 21 in the terminal airspace 10, and typically between departing and arriving aircraft 21.

Convention control operations are often made in quick manual response to an event. As used herein, an event may include congestion at a fix 17 due to the continually changing nature of departure and arrival times of aircraft 21. Another event may include a conflict caused by too close of proximity of aircraft 21 along their respective trajectories 19, such as of an arriving aircraft and a departing aircraft. Yet another event may be weather based and include changing weather conditions affecting visibility or maneuverability, such as fog, precipitation, wind, etc. Weather conditions affecting safe landing or causing congestion or trajectory conflict at another airport may also cause increased traffic in the airspace 10 due to rerouting of aircraft 21 to different airports.

Conventional control operations have one or more disadvantages. Because the aforementioned congestion and trajectory conflicts and the events causing them are often unforeseen or managed in real time on an event-by-event basis, the consequential changes in departure times and or aspects of trajectories are difficult to predict. A low level of predictability of such changes leads to operational inefficiencies with respect to workload of controllers, use of human resources and fuel burn. For example, controllers may be overtasked due to unforeseen events. The events may cause peaks and valleys in the need for additional controllers, causing often unnecessary staffing of information and control facilities 23. Further, level offs, reduced flight speeds, and increased taxing on the surface 16 each may burn fuel, an increasingly expensive and necessary resource for the airline vendors. Airline vendors would prefer to decrease taxiing and delays, and have trajectories 19 having a climb or descent that is as long and continuous as possible without a level off.

Turning now to FIGS. 2-5, and generally referencing the elements of FIG. 1, an exemplary airspace management software program 18 according to the invention is depicted, such as for managing the airspace 10 of FIG. 1. As used herein, software includes but is not limited to, one or more computer or processor instructions that can be read, interpreted, compiled, and/or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software also may be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or computer-executable instructions can be located in one logic or distributed between two or more communicating, co-operating, or parallel processing logics and thus can be loaded or executed in series, parallel, massively parallel and/or other manners.

In addition to the aforementioned description, in other embodiments, elements discussed in this specification may be implemented in a hardware circuit(s) or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The exemplary airspace management software program 18 may lessen or eliminate one or more of the aforementioned disadvantages. With reference to FIG. 1, generally, the airspace program 18 enables departing and arriving aircraft 21 at an airspace, such as at the terminal airspace 10, to take a modeled trajectory 19 based in part on predetermined preferences provided by an airline vendor, to be further described. Using the modeled trajectories 19, the airspace program 18 evaluates trajectories 19 of departing and arriving aircraft 21 within an airspace 10, such as the terminal airspace 10, and provides outputs regarding departure times and/or arriving or departing trajectories 19. Reduced level offs and delays may be allowed, resulting in reduced fuel usage and more efficient use/scheduling of human resources at information and control facilities 23.

The airspace program 18 may be included in a data structure generating system, and more particularly in an air traffic management system 20 according to the invention, also herein referred to as a system 20. The system 20 includes a non-transitory computer-readable medium 22. The medium 22 is capable of storing the airspace management software program 18, also referred to as an airspace program 18 or software program 18. The computer-readable medium 22 may include encoded thereon instructions for interfacing with a corresponding network interface, such as of an aircraft 21 or management facility 23, and reading and writing data to the corresponding computer-readable medium.

The airspace software program 18 includes various computer codes, such as computer code 28 including instructions, which include an algorithm 32, for generating data structures that are readable by a processor 24 of the system 20. The processor 24 may be a suitable computer communicatively connected to the medium 22, and is configured to execute the computer code 28 stored on the non-transitory computer-readable medium 22. For example, the processor 24 may be stored at any information or control facility 23, which may include, for example, air traffic control towers, terminal radar approach control facilities, and air route traffic control centers. These information and control facilities 23 organize and control arrivals and departures from one or more airspaces of one or more airports or other similar aircraft landing/departing facilities.

The instructions/algorithm 32 are implementable, such as executable, to receive input data structures 34 from one or more of the information and control facilities 23, analyze and manipulate the input data structures 34 via one or more functions 36, make one or more determinations 38, and output one or more output data structures 40 to one or more of the information and control facilities 23 or to an aircraft 21 based on the one or more determinations 38. As will be understood by one of ordinary skill in the art, an input data structure 34 or an output data structure 40 may be transmitted using any suitable protocol (e.g., TCP/IP, Bluetooth, SMTP, HTTP, SSL, PPP, IMAP, or any other suitable network protocol).

The management facility 23 receiving the output data structure 40 may or may not be the same management facility 23 including the processor 24 on which the airspace software program 18 is run. The management facility 23 or aircraft 21 receiving the output may include at least a processor, a network interface, and a non-transitory computer readable medium. The computer-readable medium may include encoded thereon instructions for interfacing with the corresponding network interface and reading and writing data, such as of an output data structure 40, to the corresponding computer-readable medium.

Data from, or generated as a result of, the output data structure 40 may be communicated to and displayed on a suitable display 44 at the management facility 23 or the aircraft 21 receiving the output data structure 40, or at any other management facility 23 or aircraft 21. The display 44 may be part of an aircraft dashboard, tablet computer, portable computer, desktop computer, phone, or any other suitable device.

Referring now to the management facilities 23, one exemplary management facility 23 is an air traffic control tower, or ATCT. At least one tower is often provided at an air traffic facility, such as with one or more being located at each airport. The ATCT typically controls aircraft within a tower airspace, which may be about 8 miles in diameter and from the surface to about 1,000 feet of the surface. The tower airspace may be within the terminal airspace and thus the TRACON and ATCT may share control of the tower airspace.

Another exemplary facility 23 may be the TRACON (terminal radar approach control facility). These facilities are often regional and control numerous airports located within a predetermined distance of the primary airport for the TRACON, such as within the aforementioned terminal airspace 10.

An air route traffic control center, also herein referred to as an ARTCC, is yet another exemplary facility 23. There are approximately 22 U.S. ARTCCs, for example, which are dispersed throughout the United States. The ARTCCs provide separation and advisories within enroute airspace and regional coordination of numerous TRACONs and ATCTs. A typical ARTCC provides control of airborne aircraft in enroute space from/to the airspaces overseen by respective TRACONs and/or ATCTs. This control may not be based on location of the respective ARTCC, but instead may be based on the distance of each aircraft from a designated airspace, such as within about 500 miles of a designated terminal airspace, for example.

In the United States, a single air traffic control strategic command center, or ATCSCC, manages flow of all airborne aircraft, such as airplanes. This center manages by exception by providing traffic management restrictions, such as with regards to departure times, routing and miles in trail separation at fixes, which are typically made in response to weather conditions and/or arrival or departure schedule demand.

Each airline vendor, commercial or otherwise, typically has one or more flight operation centers, or FOCs. These centers coordinate all flights, flight schedules, etc., for all aircraft and flights flying under the name of the airline vendor and/or its affiliates and/or subsidiaries.

Additionally, many airports, and other facilities from which aircraft takeoff and land, include airport surface detection equipment, also called ASDE-X, surface tracks, or surface surveillance. This equipment uses radar to provide the current surface position of each aircraft, such as by monitoring aircraft transponders. In some embodiments, the ASDE-X is integrated with the local ATCT.

In addition to this surface tracking, an airport often includes air search radar (ASR) equipment, also called airborne tracks or airborne surveillance, for similarly monitoring airborne aircraft.

Most airports also include an automated weather observation station, or AWOS. The AWOS measures and provides information with regards to weather, such as wind velocity and direction, precipitation, moisture, and visibility on the ground, i.e., on the surface.

The national weather service centers (NWS) provides similar weather-based information for terminal and enroute airspaces.

Next, the input data structures 34 received from one or more of the management facilities 23 (or from elsewhere) are herein described. The input data structures 34 themselves include one or more inputs analyzed and manipulated by the airspace program 18. The depicted input data structures 34 include, but are not limited to, terminal surveillance data 50, flight data 52, surface schedule data 54, arrival schedule data 56, weather data 58, preferred user profile data 60, constraint data 62, and airport data 64.

The terminal surveillance data structure 50 includes position and altitude data for all surface and airborne aircraft within the terminal airspace 10. The data may be provided by a TRACON or an ASDE-X or ASR, for example, or may come directly from one or more transponders in each aircraft, respectively. The data may be updated approximately once every one to five seconds, such as approximately once every second for example.

The flight data structure 52 includes data with respect to an aircraft's travel through the airspace 10. The flight data 52 is provided for all departures, arrivals and overflights for operations scheduled within a specific number of hours from provision of the flight data 52, such as about 2 or about 3 hours. Specific data provided may include trajectory inputs, such as altitude, speed, and route information, and additional information such as fixes, cruise altitude, and departure and arrival procedures. This data is often provided by the ARTCC. The data structure 54 may also include data with respect to aircraft type for each departing flight.

The surface schedule data structure 54 includes data for each airport 11 within the terminal airspace 10. The data structure 54 may include the predicted runway, predicted times of arrival to or departure from a gate, the particular gate used for each flight, and the predicted time a departing flight leaves the gate to begin taxiing (called OBT or off block time, and also herein referred to as a push time). The data may be provided for each departure/arrival scheduled at the airport within a specific number of hours from provision of the surface schedule data 54, such as about 2 or about 3 hours. The data structure 54 may also include data with respect to aircraft type for each departing flight.

The surface schedule data 54 is particularly useful in predicting queue delay of departing planes. Queue delay is defined as the delay of a departing aircraft as it waits, often physically in a line with other aircraft 21, for until a turn to use the departing airspace arrives. Note that the term "predicted" is herein used with respect to information provided as an input to the system 20, while the term "adjusted" is herein used with respect to information output from the system 20, and thus returned by the airspace software program 18.

The arrival schedule data structure 56 for the terminal provides the predicted fix crossing time at the arrival fix for each arrival aircraft 21 entering the airspace 10 within a certain amount of time from provision of the arrival schedule data 56, such as about 30 minutes. This data structure includes data with respect to timing and aircraft type for each arriving flight. The arrival schedule data structure 56 is typically provided by each airline's FOC (flight operation center), for example. The exemplary data may include primary inputs of arrival fix crossing time and speed profile. Also included may be plane type and size, which is useful in determining the distance required between successive arrivals or departures due to wake turbulence. An aircraft's wake can affect timing for subsequent movements within the airspace 10, requiring added distance and/or time be placed between movements of the aircraft.

The weather data structure 58 may include wind data, precipitation data, surface moisture data, airspace and surface visibility range (RVR) data, and additional weather forecast data. The wind data may include information such as wind speed, direction, and consistency on and off the surface within the airspace 10. Wind direction may be used to determine which runways are designated as active runways and affects the direction of takeoffs and landings because aircraft typically both takeoff and land into the wind to maximize lift. Visibility is affected by clouds, fog, precipitation, etc., and is often referred to in terms of runway visible range, also herein referred to as RVR. RVR is defined as the distance that an aircraft pilot can see along the airspace or surface. The weather data may be provided by the AWOS and NWS, for example. This data may be updated approximately every hour, for example.

The preferred user profile data structure 60 includes data provided by an airline vendor, for example, for each aircraft type and each runway or runway type of an airport. Further data may be provided depending upon the departure/arrival fix 17 through which the respective trajectory 19 extends. A preferred user profile may include preferences of one or more of heading vectors, climb/descent profile, speed profile, preferred runway, preferred fix, etc., and may include a preference for minimal or no level offs.

Constraint data 62 includes restrictions on distances or timing between aircraft trailing one another, such as miles in trail (MIT) restrictions. Additional restrictions include the previously-mentioned lateral and horizontal distance requirements, which may or may not be required at or above a specific altitude within the airspace 10.

The airport data structure 64 may include airspace configuration data, such as which runways are designated for arrival and which are designated for takeoff based on wind direction, whether runways cross one another, required distances to keep between certain sized aircraft, and recommended taxi routes along the runways grouping, such as based on aircraft size or type. The airport data structure 64 also may include the heading direction of each runway, whether or not adjacent arrival and departure runways affect one another in terms of aircraft wake, and whether or not a runway may be used for both arrivals and departures. Also included may be runways which are used during low or extremely low visibility occurring on the runways and/or when to utilize an instrument approach rather than a visual approach on a particular runway based on a particular visibility. Further included may be surface configuration data such as runway configuration/layout on the surface 16 and active or non-available runways. Particular fixes 17 may be specified for particular runways.

It will be appreciated that with respect to the plurality of input data structures 34 herein described, in other embodiments, each input data structure 34 may be provided by any suitable management facility 23 to the system 20.

Figure 5:
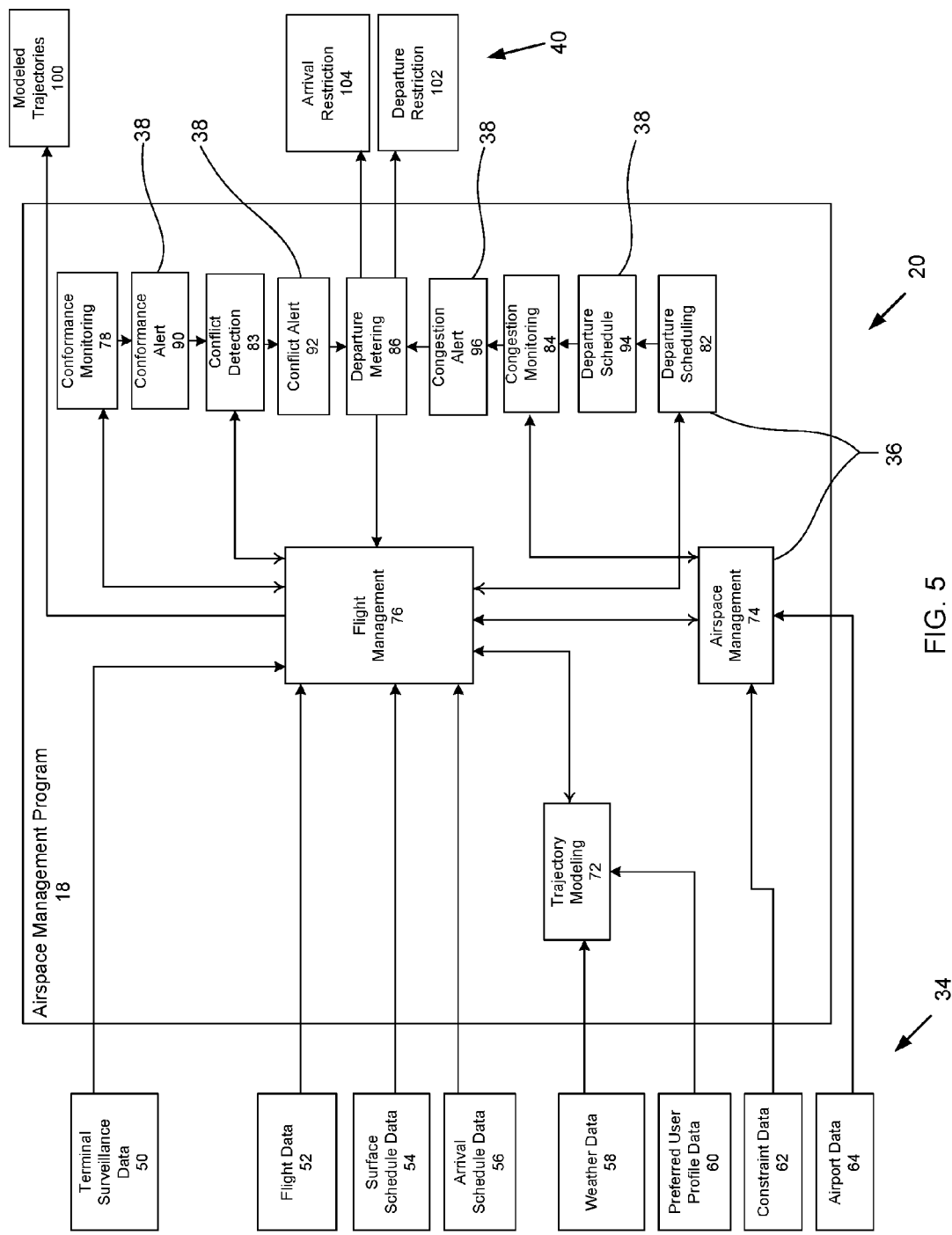
FIG. 5 is a schematic representation of still another part of an air traffic management system according to the present invention.

Turning now in specific to FIG. 5, the input data structures 34 are each manipulated by one or more functions 36 of the airspace software program 18. The functions include trajectory modeling 72, airspace management 74, flight management 76, conformance monitoring 78, conflict detection 80, departure scheduling 82, congestion monitoring 84, and arrival/departure metering 86.

The trajectory modeling function 72 receives and manipulates data from at least and the flight data structure 52 and the airport data structure 64. Required inputs include at least an input fix and an input runway from the airport data structure 64, along with an input horizontal flight path input from the flight data structure 52. Additional inputs include weather from the weather input data structure 58 and user preference data of speed profile and climb/descent profile from the preferred user profile input data structure 60.

The trajectory modeling function 72 creates a modeled trajectory 19 for an aircraft 21 given a fix 17, runway, and horizontal flight path. For example, a departure trajectory 19 may require at least inputs of a departure fix 17, departure runway, and a horizontal flight path, while an arrival trajectory may require at least an arrival fix 17, landing runway, and corresponding horizontal flight path. The function 72 may also manipulate trajectory preferences and terminal winds received from the preferred user profile data structure 60 and weather data structure 58, respectively. Data regarding aircraft type, such as including engine data, received with the flight data structure 52 may enable a more accurate trajectory 19 to be modeled. The modeled trajectory 19 is used to predict the time that an aircraft 21 will cross a specific fix 17 and the position of the aircraft 21 at future times in the airspace 10. The modeled trajectory data is output from the airspace program 18 as a modeled trajectory output data structure 100 including a plurality of modeled trajectories 19, which may be transmitted to any of the management facilities 23.

The airspace management function 74 maintains data that defines the airports 11, fixes 17, trajectories 19, and boundaries 13, 14, 15, and 16 for the terminal airspace 10. This data may be received as part of the airport data input data structure 64 and the traffic management input data structure 62.

The flight management function 76 maintains the adjusted airborne flight data received by the system 20. This function 76 serves as a repository of received input data. This includes, but is not limited to, data from the flight data structure 52, takeoff predictions from the surface schedule data structure 54, and fix crossing predictions from the arrival schedule data structure 56. The function 76 also manipulates the modeled trajectory output data structure 100 for each aircraft 21, the latest tracking data from the conflict detection function 80, and a conformance alert data structure 90 from the conformance monitoring function 78.

The conformance monitoring function 78 receives terminal tracks from the terminal surveillance input data structure 50 to determine if an aircraft 21 is in conformance with its modeled trajectory. The actual position is compared to the predicted position output from the trajectory modeling function 72 (which also may be received from the flight management function 76 that may store modeled trajectories 19) to determine a margin associated with the actual trajectory. Separate values may be maintained for conformance to the lateral trajectory, altitude profile, and speed profile. The modeled trajectory data structure 100 may be updated in view of too great of a deviation in any of these values, such as to align with the actual trajectory 19 of the respective aircraft 21, and a conformance alert determination data structure 90 may be generated. In other embodiments, the function 78 instead may be configured only to provide conformance data 90 to the conflict detection function 80 without automatically changing or suggesting a change to a trajectory 19. The conformance alert data 90 is further output to the conflict detection function 80 and may be separately output from the airspace software program 18 to any of the management facilities 23.

The conflict detection function 80 compares the trajectory 19 of each aircraft 21 departing the surface 16, within a predetermined window of time from each running of the function 80, with the trajectory of each aircraft 21 arriving to the airspace 10, within the same predetermined window of time. In this way, the function 80 determines whether the relative predicted positions of the aircrafts 21 along a plurality of points along the respective modeled trajectories 19 fall within or outside of predetermined margins in latitude or altitude. The predetermined window of time may be about two hours, for instance. Where a conflict of too close of proximity of aircraft 21 to one another is determined to occur at a future time, a conflict alert determination data structure 92 is published. The conflict alert data structure 92 is further output to the arrival/departure metering function 86 and may be separately output from the airspace software program 18 to any of the management facilities 23.

It will be appreciated that the conflict detection function 80 may further compare the trajectory 19 of each aircraft 21 arriving to the airspace 10 within the predetermined window of time to the other of the arriving aircraft 21 arriving to the airspace within the predetermined window of time. Likewise, the conflict detection function 80 may compare the trajectory 19 of each aircraft 21 departing from the airspace 10 within the predetermined window of time to the other of the departing aircraft 21 departing from the airspace within the predetermined window of time.

The departure scheduling monitor 82 generates the departure schedule using the modeled trajectory of each aircraft 21 from the modeled trajectory output structure 100 to predict the fix crossing time at the corresponding departure fixes 17 and outputs this data as the departure schedule determination data structure 94.

The congestion monitoring function 84 receives and evaluates the departure schedule determination data structure 94 to detect when departure constraints are exceeded causing congestion at a fix 17 and identifies the aircraft 21 involved in the congestion. A congestion alert determination data structure 96 is output from the congestion monitoring function 84 and received by the arrival/departure metering function 86 for further evaluation. The congestion alert determination data structure 96 may be separately output from the airspace software program 18 to any of the management facilities 23.

The arrival/departure metering function 86 resolves departure fix congestion and trajectory conflicts via output of departure restriction output data structures 102 and arrival restriction output data structures 104. The data structures 102 and 104 may include adjustments being adjusted arrival/departure trajectories 19 or adjusted departure times provided as suggestions or the outputs 102 and 104 may include adjustments being automatically updated departure times absent input from any traffic control personnel.

The function 86 is configured first to output a departure restriction data structure 102 including adjusted departure times from the surface 16. Departure times of departing aircraft 21 are adjusted on a first-come-first-serve basis. The function 86 is configured to maintain the initial order of the current departure schedule determination data structure 94, but to include delays of departure times. Release/departure times are calculated and maintained such that departure fix constraints, for example miles in trail requirements, are maintained at the respective departure fix 17. The departure restriction data structure 102, including the adjusted release/departure times, may be output from the airspace software program 18 to any of the management facilities 23.

It will be appreciated that the metering function 86 is configured to first attempt adjusting departure times to avoid adjustments to the modeled departure/arrival trajectories 19, thereby enabling a maximum benefit of reduced fuel burn where possible. Nonetheless, instances may occur where adjustment of departure times does not resolve fix congestion, trajectory conflict, or a combination of fix congestion and trajectory conflict, or the departure time adjustment reaches a lower limit, such as where even a maximum delay will not resolve the issue. In such instances, the metering function 86 may be configured to additionally or alternatively suggest, but not to automatically introduce, adjustments in trajectories of arriving or departing aircraft 21. In such case, the metering function may evaluate departure trajectories 19 and/or arrival trajectories 19 and output one or both of a departure restriction output data structure 102 or an arrival restriction output data structure 104 including trajectory adjustments being adjustment suggestions only. In this case, the structures 102/104 may include data regarding reduction in speed, adjusted heading vector, and/or an added or adjusted level off for one or more aircraft 21. The function 86 may be preconfigured only to adjust trajectories of departure aircraft 21, only to adjust trajectories of arrival aircraft 21, or to balance adjustments by adjusting the trajectory of whichever aircraft 21 would result in the least reduction in speed, a preference for preventing level offs, etc. The data structure(s) 102/104, including the suggested adjusted trajectories 19, may be output from the airspace software program 18 to any of the management facilities 23.

It will be appreciated that the any of the aforementioned functions 38 may receive any of the aforementioned input data structure 34 direction or as a result of an interaction with another of the aforementioned functions 38. It will be appreciated that any of the aforementioned functions 38 may analyze and evaluate data with respect to all aircraft airborne in the airspace 10 during a predetermined time window, or with respect to any suitable subset, such as all departing aircraft, all arriving aircraft, a set of aircraft including a plurality of departing aircraft where the plurality may not include all departing aircraft, or a set of aircraft including a plurality of arriving aircraft where the plurality may not include all arriving aircraft airborne in the airspace 10 during the predetermined time window.

Numerous determinations 38 may be output from the functions 36 and may be output from the airspace program 18 in the form of determination data structures 38 (also herein referred to as secondary output data structures 38). The information therein may be provided as reports to one or more management facilities 23. Further, the determination data structures 38 are manipulated by further functions 36 to provide the primary output data structures 40. The determination data structures 38 include conformance alerts 90, conflict alerts 92, departure schedules 94, and congestion alerts 96.

The conformance alert determination data structure 90 is output from the conformance monitoring function 78. The data structure 90 includes alerts where deviation of actual trajectory 19 from predicted trajectory 19 is too great, such as with respect to lateral position, altitude profile, and speed profile differential values crossing separate value thresholds. The separate value thresholds may be provided with the traffic management constraints input data structure 62, for example. The data structure 90 may include a suggested adjustment to the modeled trajectory of the respective offending aircraft 21 to account for the deviation from the previously calculated modeled trajectory. In other embodiments, the data structure 90 may only include a reporting of the deviation values in lateral position, altitude profile, and or speed profile. This output may be regenerated every 5 seconds, for example.

The conflict alert determination data structure 92 includes data regarding proximity conflicts where distance/time between at least two aircraft 21 on respective trajectories 19 is lower than a minimum threshold. A minimum threshold may be provided for direct line-to-line distance and/or for lateral location, vertical location, etc. The minimum thresholds may be provided with the traffic management constraints input data structure 62. The data structure 92 may include proximity information with respect to lateral separation, vertical separation, or trailing distance/time, for example. In one embodiment, aircraft within about 1,000 feet of one another may be required to maintain horizontal spacing of about 3 miles or more. This output may be regenerated every 5 seconds, for example.

The departure schedule determination data structure 94 is based in part on the modeled trajectories 19 contained in the modeled trajectory output data structure 100. The departure schedule determination data structure 94 includes a fix crossing time at a corresponding departure fix 17 for each aircraft 21 evaluated. This output may be regenerated every 5 seconds, for example. It will be appreciated that the crossing times are estimates based on available input data and that aircraft, events, or other circumstances may contribute to such estimates being different than actual crossing times of the aircraft 21 in real time.

The congestion alert determination data structure 96 includes data regarding congestion at any fix 17 on the fix boundary 14. A list of fixes 17 may be provided with the airport data input data structure 64. The data structure 96 may include information regarding a breaking of a miles in trail requirement, for example, and at minimum include data regarding which departing aircraft will crossover a particular fix 17 within too short of a time to one another, thus breaking a miles in trail requirement. This output may be regenerated every 5 seconds, for example.

The primary output data structures 40 output as a result of generation of the determinations 38 (secondary output data structures) or operations of the functions 36 include a modeled trajectory data structure 100, a departure restriction data structure 102, and an arrival restriction data structure 104. One or more of these output data structure 40 may be output from the airspace program 18. Where more than one is output, it will be appreciated that the output data structures 40 may be generated concurrently or in any succession depending on configuration of the airspace program 18.

The modeled trajectory data structure 100 includes a modeled trajectory 19 for each aircraft 21 in the airspace 10 and is output from the trajectory modeling function 72. Included may be indications of vector heading, speed, and possible level offs for each departing and arriving aircraft 21 evaluated by the trajectory modeling function 72. The modeled trajectory data 100 is manipulated in numerous downstream functions, such as for calculating arrival and departure restrictions output in the respective departure restriction output data structure 102 and arrival restriction output data structure 104. This output may be provided to the aircraft 21 and/or airline vendors, in addition to one or more management facilities 23. This output may be regenerated every 30 seconds, for example.

The departure restriction data structure 102 is output from the arrival/departure metering function 86. The data structure 102 includes adjusted release/departure times for departing aircraft 21. As aforementioned, this data may be provided as a suggestion or as a report of automatic adjustments having been made. This output may be regenerated every 30 seconds, for example.

The arrival restriction data structure 104 also is output from the arrival/departure metering function 86. The data structure 104 includes data regarding reduction in speed, adjusted heading vector, and/or an added or adjusted level off for one or more arriving aircraft 21. As aforementioned, this data may be provided as a suggestion. This output may be regenerated every 30 seconds, for example. Because the data is merely suggestive, departure and arrival controllers (personnel) may manage affected flights tactically by issuing speed restrictions, interim altitudes, vectors, etc.

It will be appreciated that any determination data structure 38 or output data structure 40 may be output to any one or more management facilities 23, aircraft 21 or any other suitable processor. It will also be recognized that any output data structure 40 or determination data structure 38 may be regularly provided at any suitable time interval, or instead may be provided at the occurrence of any event, such as a proximity conflict, fix congestion, or change in weather. Any of the determination data structures 38 or output data structure 40 may be provided concurrently with one another or in any suitable succession.

Referring next to FIGS. 6 to 11, in addition to continued reference to FIGS. 1 and 5, the processor-executable instructions 32 executed by the software program 18 may be best appreciated with reference to the flow diagrams of FIGS. 6 to 11, which for purposes of simplicity of explanation are shown and described as a series of blocks. The methodologies are not limited by the order of the blocks, as some blocks can occur in different orders or concurrently with other blocks from that shown or described, such as in parallel or in series with other blocks. Moreover, less than all the illustrated blocks may be required to implement an example methodology. Each depicted methodology of each of the FIGS. 6 to 11 may be only one of numerous methodologies available for executing a particular function or providing a particular output. Furthermore, additional or alternative methodologies can employ additional, non-illustrated blocks.

In the flow diagrams, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object-oriented or artificial intelligence techniques.

Figure 6:
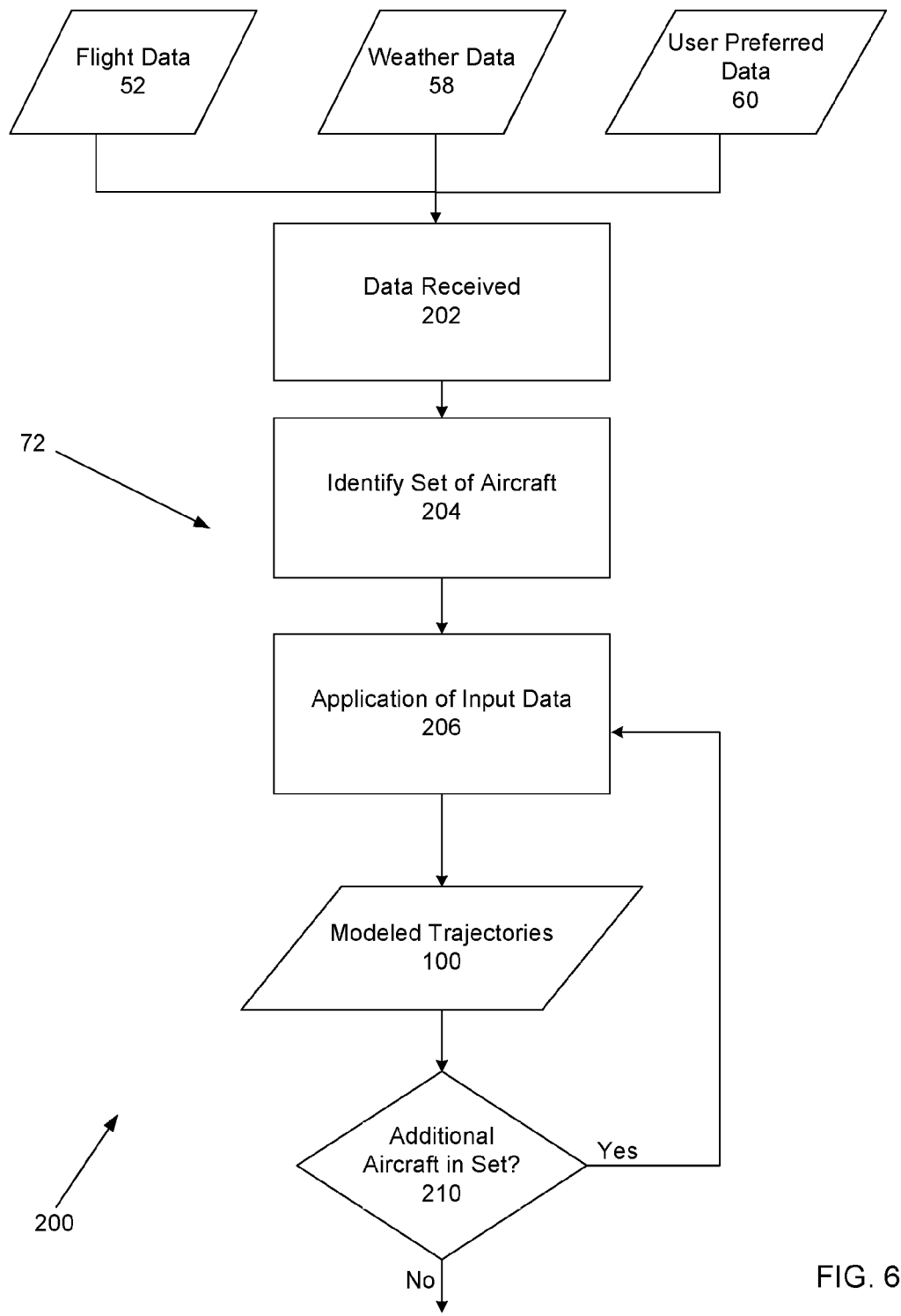
FIG. 6 is a schematic representation of processor-executable instructions included in the system shown in FIGS. 2-4.

Turning first to FIG. 6, a process 200 is depicted representing the process of the trajectory modeling function 72. The weather input data structure 58, the preferred user profile input data structure 60, the airport data structure 64 and the flight data structure 52 are depicted as inputs. In particular, the trajectory modeling function 72 may utilize wind direction data from the weather data structure 58, a majority of the user preferences from the data structure 64, a list of fixes and runways from the airport data structure 64, and a list of flights, runways and fixes from the flight data structure 52. At a first block 202, the input data structures 34 are received. Next, a set of aircraft is identified at block 204 for which modeled data structures are to be modeled.

With reference the process 200 of FIG. 6, but applicable to all other processes or functions described herein, the set of aircraft analyzed may include only aircraft departing from the airspace within a predefined range of time from initiation of the respective process. Alternatively, the set of aircraft may include only aircraft arriving from the airspace within the predefined range of time. Or, the set of aircraft may include both departing and arriving aircraft with respect to the airspace and the predefined range of time. Each set of aircraft may include all aircraft in the airspace or only a subset.

At block 206, the input data from the input data structures 34 is applied to a first aircraft of the set of aircraft. The first aircraft may be the first aircraft to depart, first to arrive, etc. with respect to the airspace, with the next aircraft analyzed being the next to depart or arrive. A modeled trajectory data structure 100 is output from the block 206 for the first aircraft. Next, at decision block 210, where there are additional aircraft in the set for which modeled trajectories have yet to be modeled, the process returns to block 206. On the other hand, where a modeled trajectory data structure 100 has been output for each aircraft of the set of aircraft identified at block 204, the process 200 is completed. The process may be re-run every about 30 seconds, for example, using input data that is more current and with respect to a set of aircraft that may have changed. The aircraft may be analyzed in any suitable order.

Figure 7:
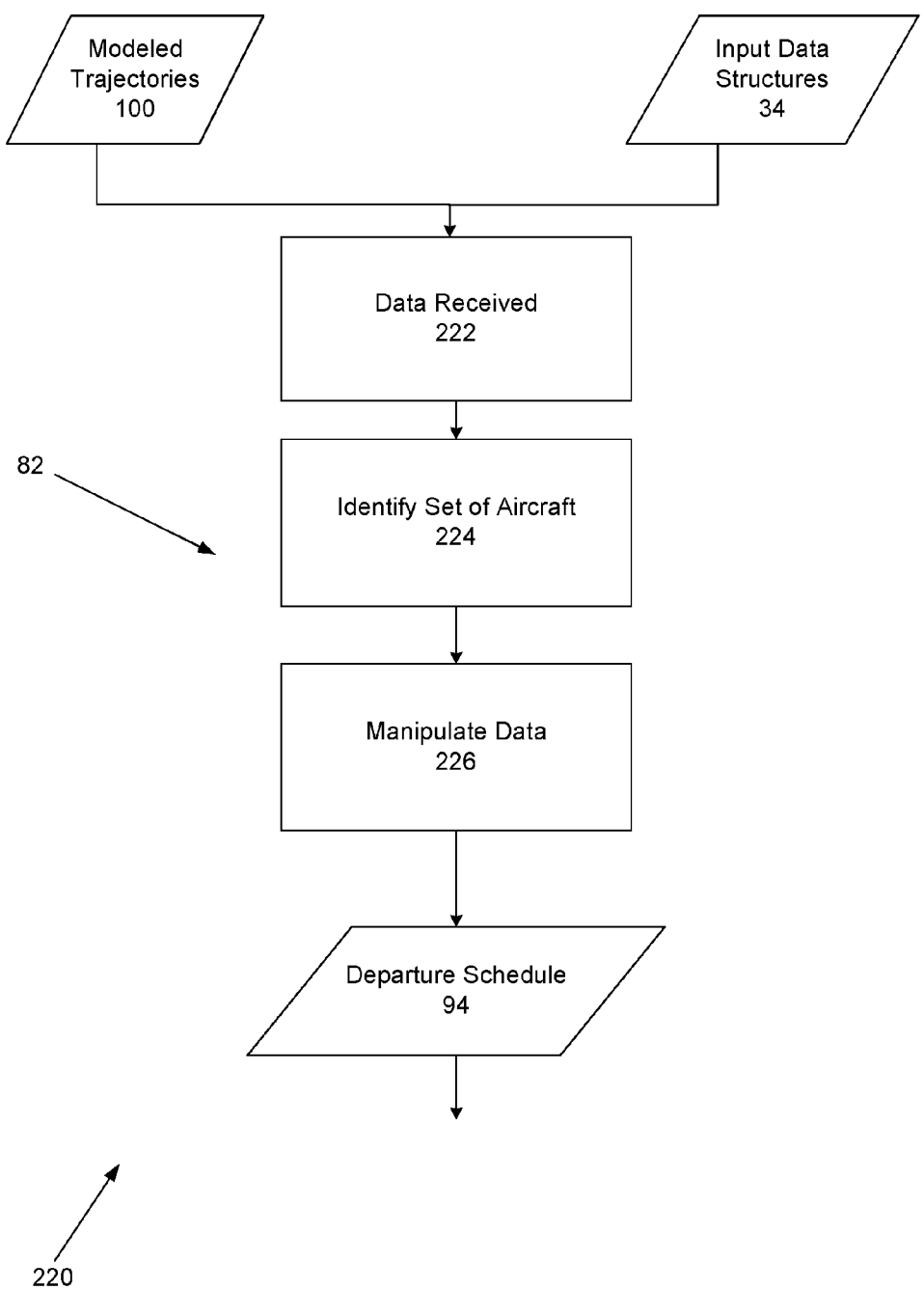
FIG. 7 is another schematic representation of processor-executable instructions included in the system shown in FIGS. 2-4.

Referring now to FIG. 7, a process 220 is depicted representing the departure scheduling function 82. The modeled trajectory data structure 100 and suitable input data structures 34 are received at the first process block 222. A set of departing aircraft is identified at block 224, including some or all of the aircraft departing from the airspace during the same or different predefined time range as was used in the process 200 of the function 72, and for which the output departure schedule data structure 94 is to be generated. At process block 226, the input data received at process block 222 is manipulated and the departure schedule determination data structure 94 is generated as an output to the process 220. At the process block 226, the departing aircraft may be scheduled based upon at least miles-in-trail requirements at the respective airport. The process may be re-run every about 30 seconds, for example.

Figure 8:
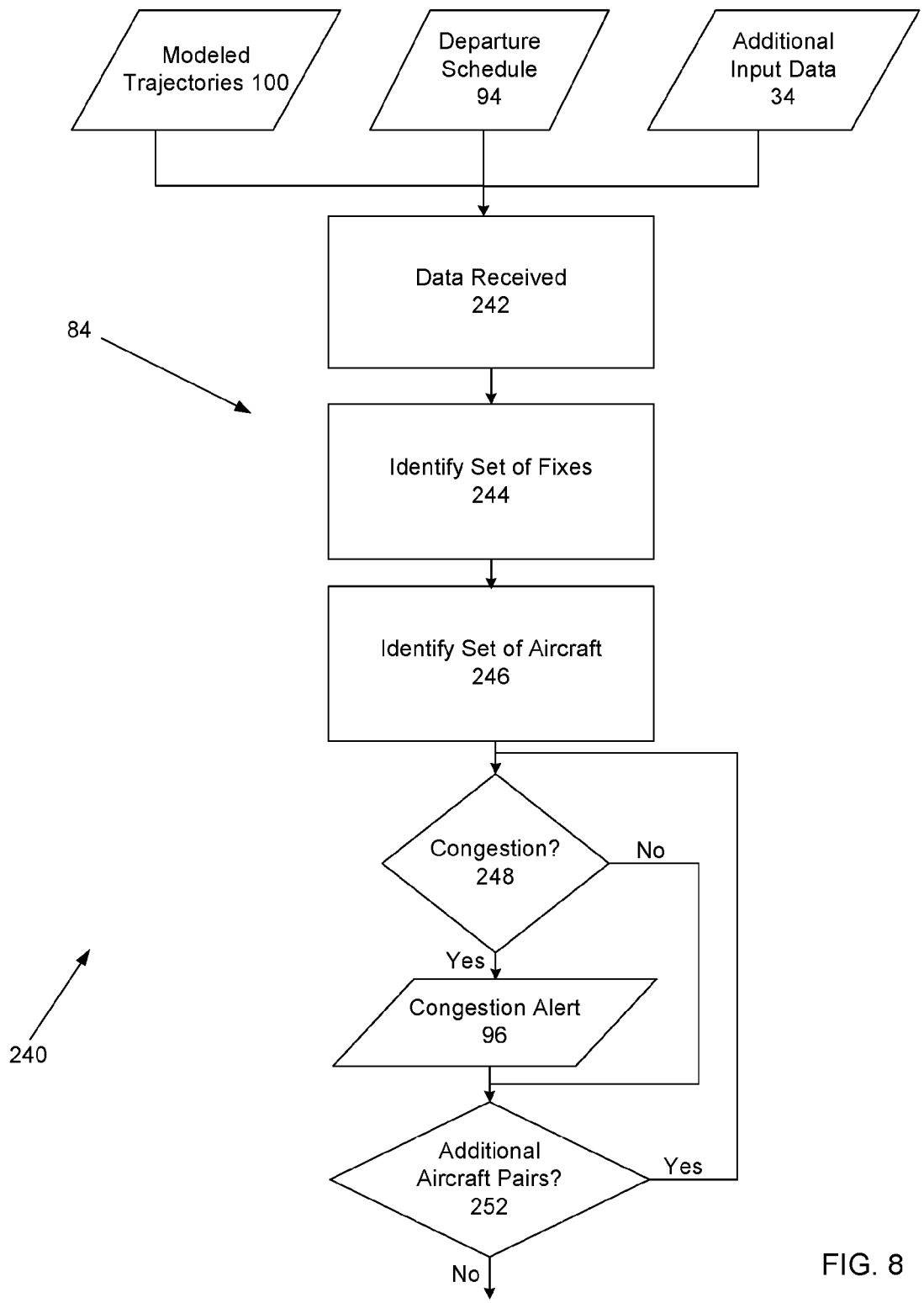
FIG. 8 is still another schematic representation of processor-executable instructions included in the system shown in FIGS. 2-4.

Turning next to FIG. 8, a process 240 is depicted for the congestion monitoring function 84. The departure schedule determination data structure 94, modeled trajectory data structure 100 and various input data structure 34 are received as input data at the first process block 242 of the process 240. At block 244, a set of available fixes is identified based on input data such as weather data from the weather data structure 58 and a full set of fixes (regardless of present availability) from the airport data structure 64. In other embodiments, only a set of available fixes may be received or identified. An available fix may be one that is not closed by a management facility 23 and one that is not closed in view of weather or some other event, for instance. Next, at block 246, again, a set of departing aircraft is identified that will depart the airspace within a predefined time range, for example two hours, from the start of running of the process 240.

Turning to decision block 248, it is determined whether for a fix, there is congestion at the fix between a first pair of aircraft of the set of departing aircraft. Congestion may be defined as a lack of required separation distance or time, such as a miles-in-trail requirement, between the aircraft of the pair. Where there is determined to be congestion, a congestion alert determination data structure 96 is generated for the pair of aircraft. This data structure 96 is output from the process 240 at this time. Where there is determined not to be congestion between the pair of aircraft (and after generation of the data structure 94, on the other hand) the process moves to another decision block. At the decision block 252, if there are no additional non-yet-paired departing aircraft of the set from process block 246 yet to be analyzed, the process 240 ends. On the other hand, where there are additional non-yet-paired departing aircraft to be analyzed, the process returns to the congestion determination decision block 248 and the process 240 continues. This process 240 may continue to be rerun, such as every about 30 seconds for example. It will be appreciated that the sets of aircraft departing at/crossing different fixes may be analyzed concurrently, in succession about the respective fix boundary, or in any suitable order.

Figure 9:
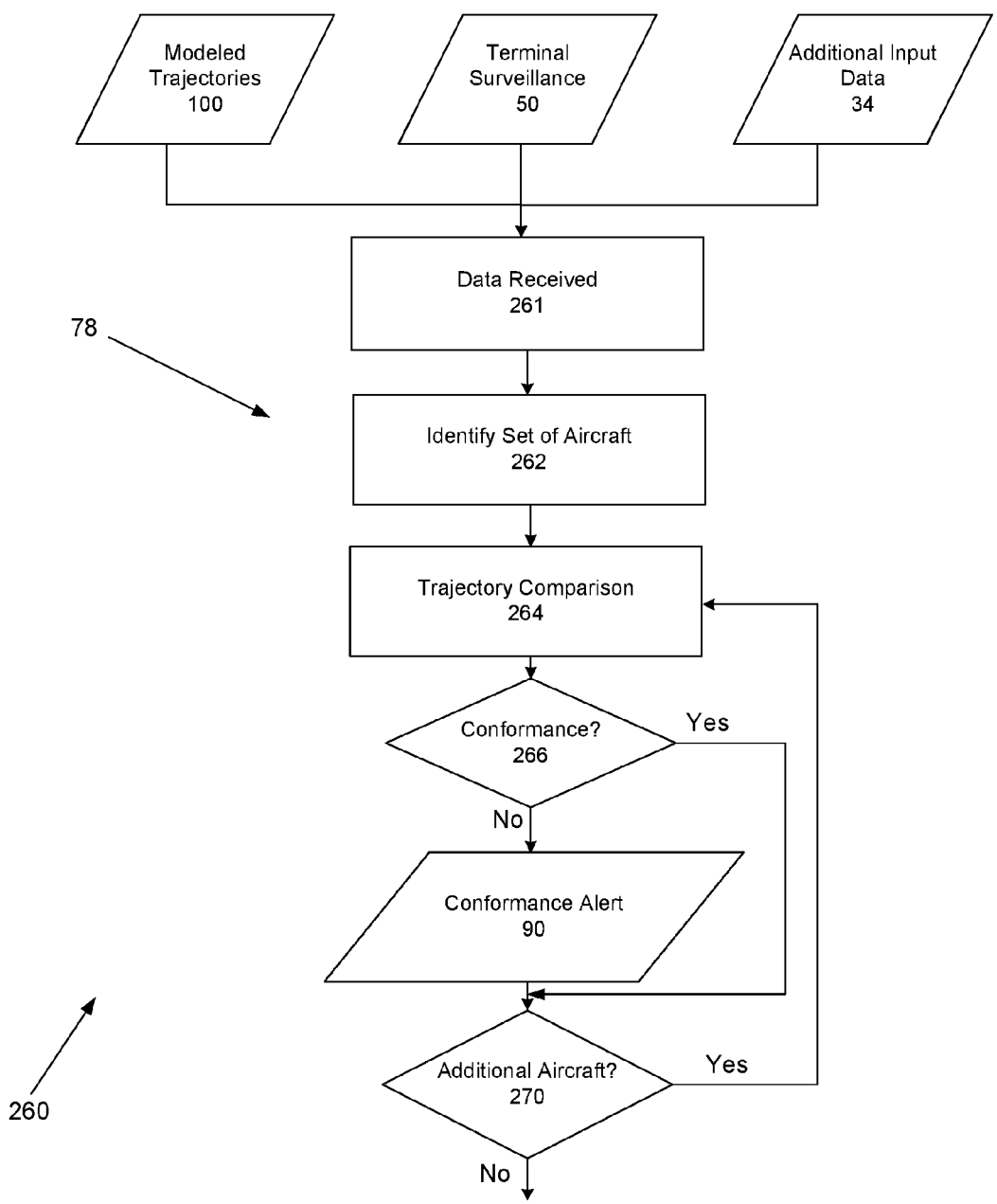
FIG. 9 is another schematic representation of processor-executable instructions included in the system shown in FIGS. 2-4.

Turning now to FIG. 9, the process 260 is depicted representing the conformance monitoring function 78. The modeled trajectory data structure 100 and terminal surveillance data from the terminal surveillance data structure 50 is received at the process block 261. Additional input data structures 34 also may be received. At process block 262, aircraft airborne within the airspace are identified. These aircraft may include departing aircraft, arriving aircraft and aircraft crossing through the airspace. At block 264, the actual position of a first aircraft is compared to the predicted position of the aircraft based on the modeled trajectory data structure 100. The actual position may be supplied based on data being output from a transponder of the respective aircraft, for example. The order of aircraft to be analyzed may be any suitable order.

At decision block 266, where there is conformance of the actual position of the aircraft to the predicted position of the aircraft, the process 260 moves to the next decision block, being 270. On the other hand, where there is determined to be non-conformance of one or more of a horizontal position or vertical position of the aircraft, a conformance alert data structure 90 is generated for the respective aircraft and output from the process 260 at this point in the process. A horizontal position or vertical position value may be non-conforming if the differential value between the actual and predicted position exceeds a predetermined threshold. The threshold may be input from the airport data structure 64, for example. The conformance alert data structure 90 may include adjustment of a remainder of the modeled trajectory of the non-conforming aircraft not yet traveled to account for the horizontal or vertical deviation. In some embodiments, the conformance monitoring function 78, including the process 260, may be configured only to adjust the modeled trajectory after generation of more than one respective conformance alert 90, such as three conformance alerts 90. The adjustment may be suggested or automatic.

At the decision block 270, where there are additional active aircraft to analyze, the process returns to the process block 264. Where all active aircraft from the set identified at the process block 262 have been analyzed, the process 260 ends. The process 260 may be run at any suitable interval, such as every 30 seconds, for example.

Figure 10:
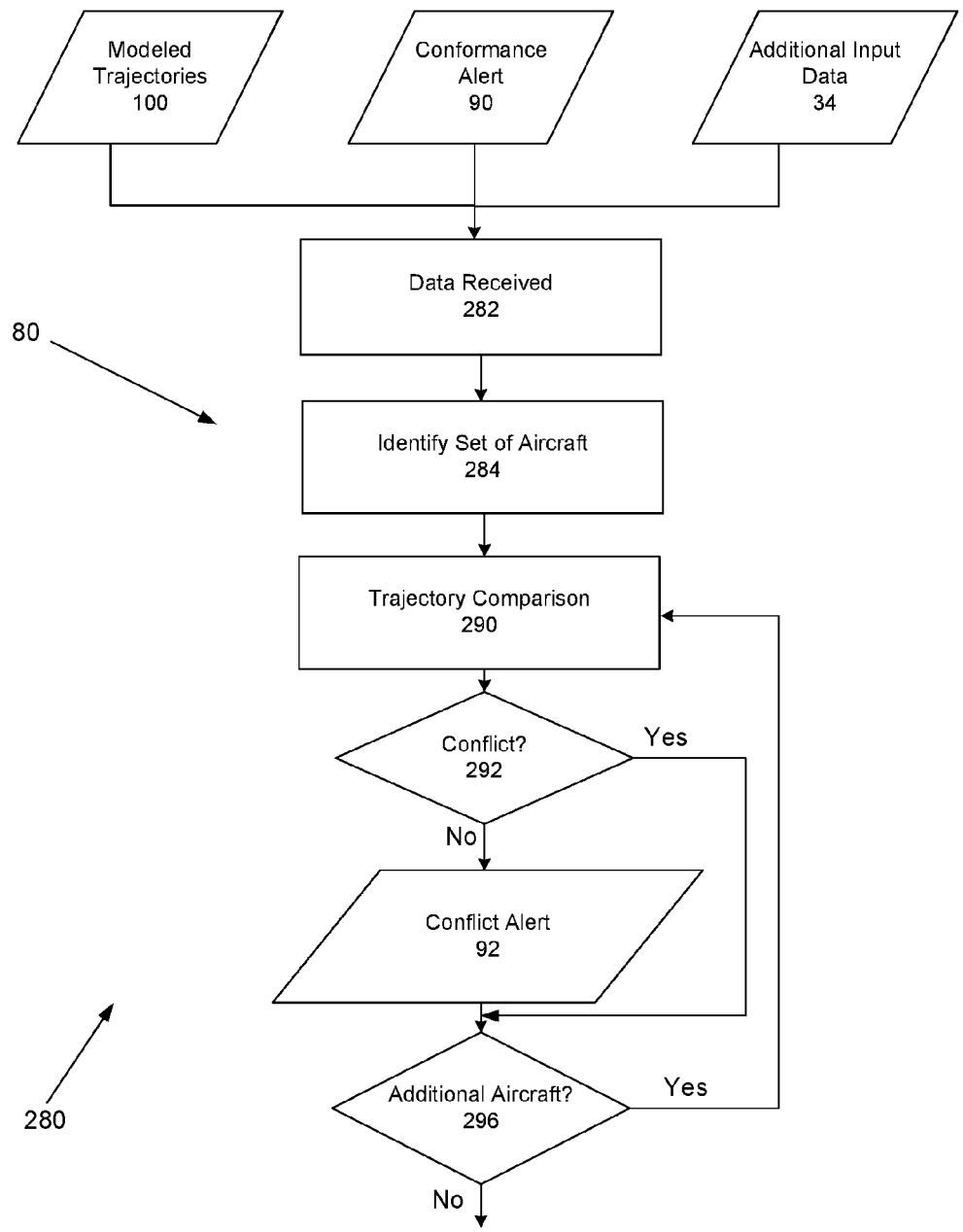
FIG. 10 is yet another schematic representation of processor-executable instructions included in the system shown in FIGS. 2-4.

Turning next to FIG. 10, the process 280 is depicted for the conflict detection function 80. This process 280 may be re-run at any suitable set interval or additionally or alternatively in response to occurrence of an event, such as a conformance alert 90. At the first process block 282, data structures are received such as the modeled trajectory data structure 100, conformance alert data structure 90 and various input data structures 34. Included may be data regarding arriving and departing flights from the arrival schedule data structure 56 and from the surface schedule data structure 54, respectively.

At process block 284, a set of aircraft to be analyzed is identified. The set of aircraft may be those aircraft active within the airspace (airborne) within a predefined window of time, such as about two hours from the initiation of the process 280. The aircraft for analysis may include departing aircraft only, arriving aircraft only, or both arriving and departing aircraft. Where suitable, the set of aircraft may further include crossover aircraft passing through the airspace.

At process block 290, a trajectory of a first aircraft of the set of aircraft identified at block 284 is compared to the trajectories of all other remaining aircraft of the set of aircraft. This block 290 compares separation distance or time values of the first aircraft at a plurality of points along the trajectory of the first aircraft to the trajectories of the remaining aircraft of the set. Points of analysis on a trajectory 19 may be separated by about one second, for example. The order of aircraft analyzed may be random or otherwise suitably generated. It will be appreciated that based on timing of activity of aircraft within the airspace, the comparison is made based on respective timing schedules for travel through the airspace of the compared aircraft. For example, one aircraft may not even be airborne when the first aircraft is airborne, yet their respective trajectories may cross. This does not cause a conflict. Rather concurrently active aircraft trajectories are compared and non-concurrently active aircraft trajectories are ignored.

At decision block 292, it is determined whether there is a conflict between trajectories, where separation requirements are not being met. For example, miles-in-trail requirements may not be satisfied. Where a conflict is found to occur in the future, a conflict alert determination data structure 92 is generated and output from the process 280. Where no conflict is found to occur, and also after generation of the conflict alert 92 on the other hand, the process 280 moves to the next decision block 296.

At the decision block 296, where there are additional aircraft of the set left that have not been compared to all other aircraft of the set, the process returns to the comparison process block 290. Where all aircraft of the set have been compared to all other aircraft of the set, the process 280 ends.

Figure 11:
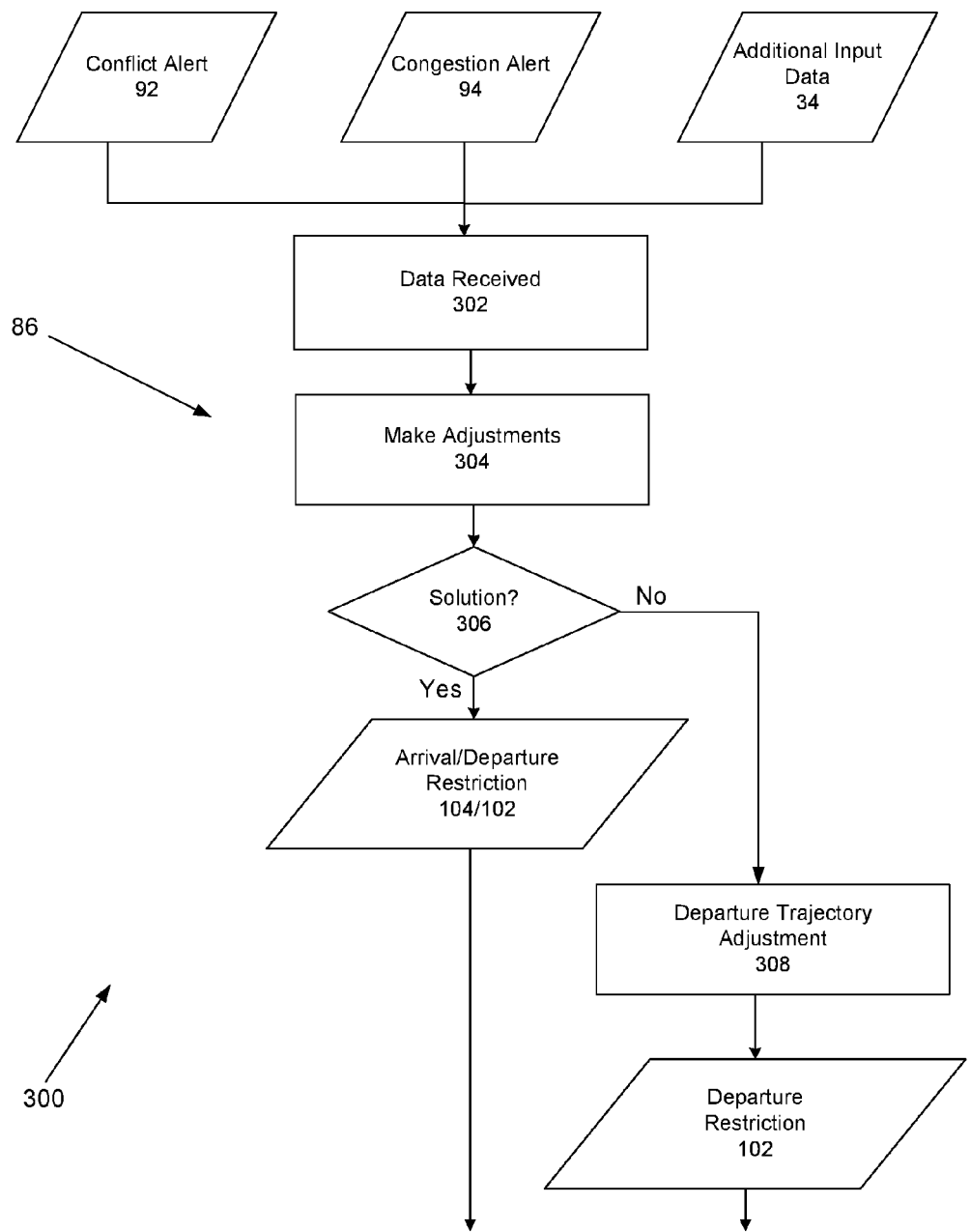
FIG. 11 is still another schematic representation of processor-executable instructions included in the system shown in FIGS. 2-4.

Referring now to FIG. 11, the process 300 is depicted representing the running of the arrival/departure metering function 86. The is process 300 may be re-run at any suitable set interval or additionally or alternatively may be re-run in response to occurrence of an event, such as generation of a conflict alert 92 or a congestion alert 96. At the first process block 302, data structures are received. These data structures may include congestion alerts 96, conflict alerts 92 and various input data structures 34.

At the process block 304, departing times of one or more of the departing aircraft involved in the input congestion alert 96 or conflict alert 92 are analyzed and adjusted to allow the required minimum separation distances or times (previously not met and causing the congestion alert 96/conflict alert 92) between the involved aircraft now to be met. The process block 304 is configured to adjust the departure times of the one or more aircraft of the involved departing aircraft such that a departure order of the involved departing aircraft is maintained.

Where departing aircraft are not involved and only arriving aircraft are involved, the process block 304 is configured to adjust one or more aspects of the modeled trajectory of one or more aircraft of the plurality of arriving aircraft involved in the conflict alert 92. The adjusted aspects of the modeled trajectory(s) may include climb profile and speed profile, or the addition of one or more level offs.

At decision block 306, it is determined whether or not a resolution was possible, such that miles in trail requirements or other separation requirements can once again be met. Where resolution is possible, the respective arrival restriction data structure 104 or departure restriction data structure 102 is output, including the aforementioned adjusted aspects of an arrival aircraft trajectories or adjusted departure times of departing aircraft, respectively. In such case, the output data structure 102/104 is output from the process 300 and the process 300 ends. Where a resolution was not met, the process 300 moves to the process block 308. A resolution may not be met, for example due to weather or too many active aircraft in the airspace.

Typically, where only arriving aircraft were involved, a resolution will generally be met. Accordingly, at the process block 308, generally at least one or more departing aircraft have been involved in the offending conflict alert 92 or congestion alert 96. In such cases, process block 308 is configured to adjust one or more aspects of the modeled trajectory of one or more aircraft of the plurality of departing aircraft involved in the conflict alert 92/congestion alert 96. Note that in line with the aims of the program 18, adjustment of the trajectories occurs only after adjustment of departure times has been attempted by the program 18. The adjusted aspects of the modeled trajectory may include climb profile and speed profile, or the addition of one or more level offs, though in line with the aims of the program 18, addition of level offs is attempted only where forced by personnel or where adjustment of alternative aspects does not resolve the issue. A departure restriction output data structure 102 is generated and output at this stage in the process, including the adjusted aspects of the one or more departing aircraft, and the process 300 ends.

It is noted that at each step requiring use of an input data structure 34/output data structure 40/determination data structure 38, the step utilizes the most recently available particular data structure provided to the system 20 and/or received by the system 20. Additionally, in other embodiments, one or more of the above-identified steps may use additional or fewer data structures than described for use in the exemplary embodiment. It will further be appreciated that any of the above-mentioned processes may be run at any suitable interval or additionally or alternatively in response to any suitably defined event.

In summary, by utilizing modeled trajectories and continually analyzing possible congestion and conflict in advance of occurrence, reduction in fuel burn, and unused personnel hours, for example, can be achieved. The benefits are further achieved by an aim of the program 18 being to first attempt to adjust departure release times prior to adjustment of any aspects of a trajectory, thereby leaving the modeled trajectories unchanged where possible. Even further, if it is determined that one or more modeled trajectories must be adjusted, a further aim of the program 18 is to avoid addition of one or more level offs, where possible, in an attempt to eliminate altogether the need for artificial level offs for all departing and all arriving aircraft in an airspace, as is conventional but often unnecessary.

Figure 12:
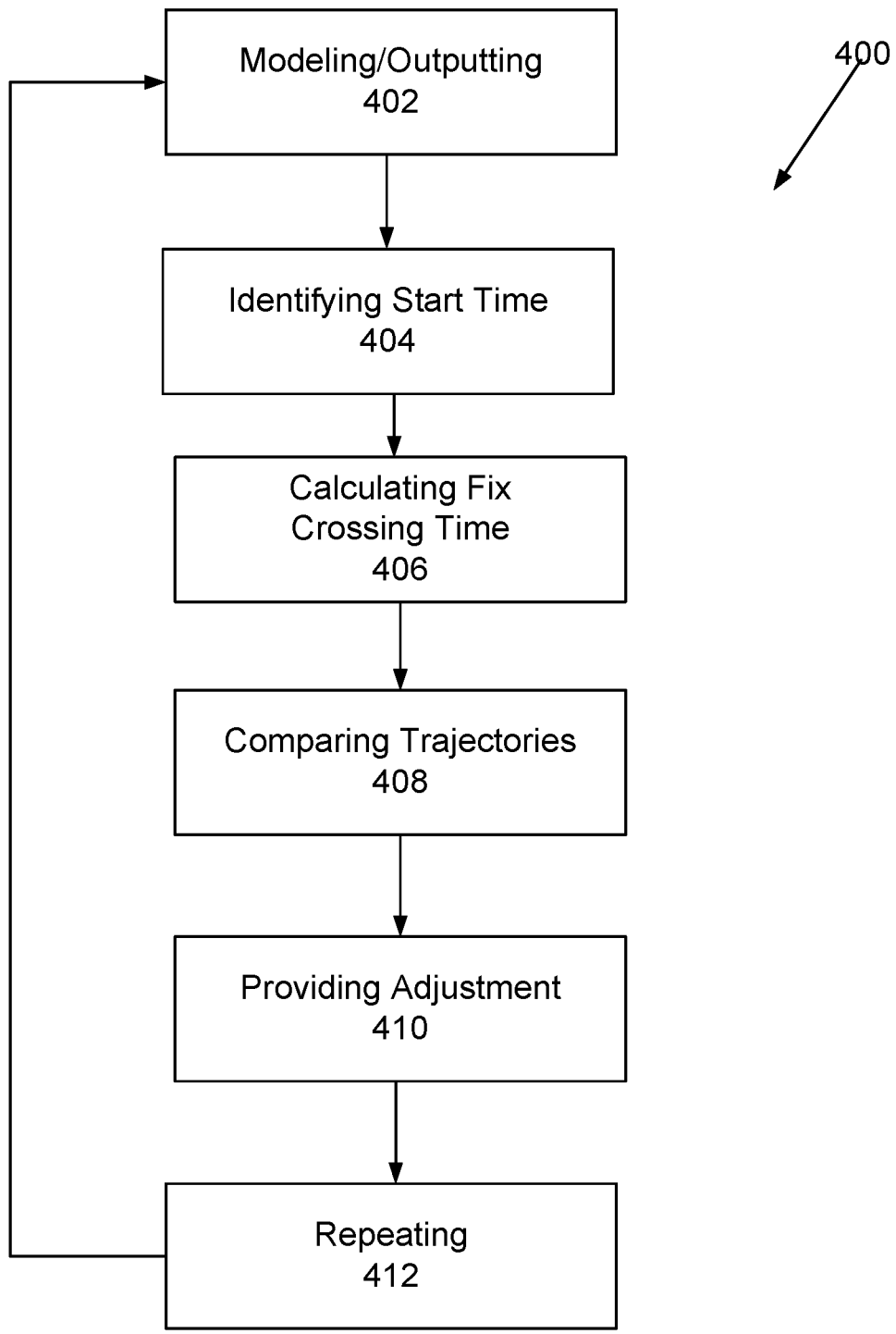
FIG. 12 is a schematic representation of a method according to the present invention.
Figure 13:
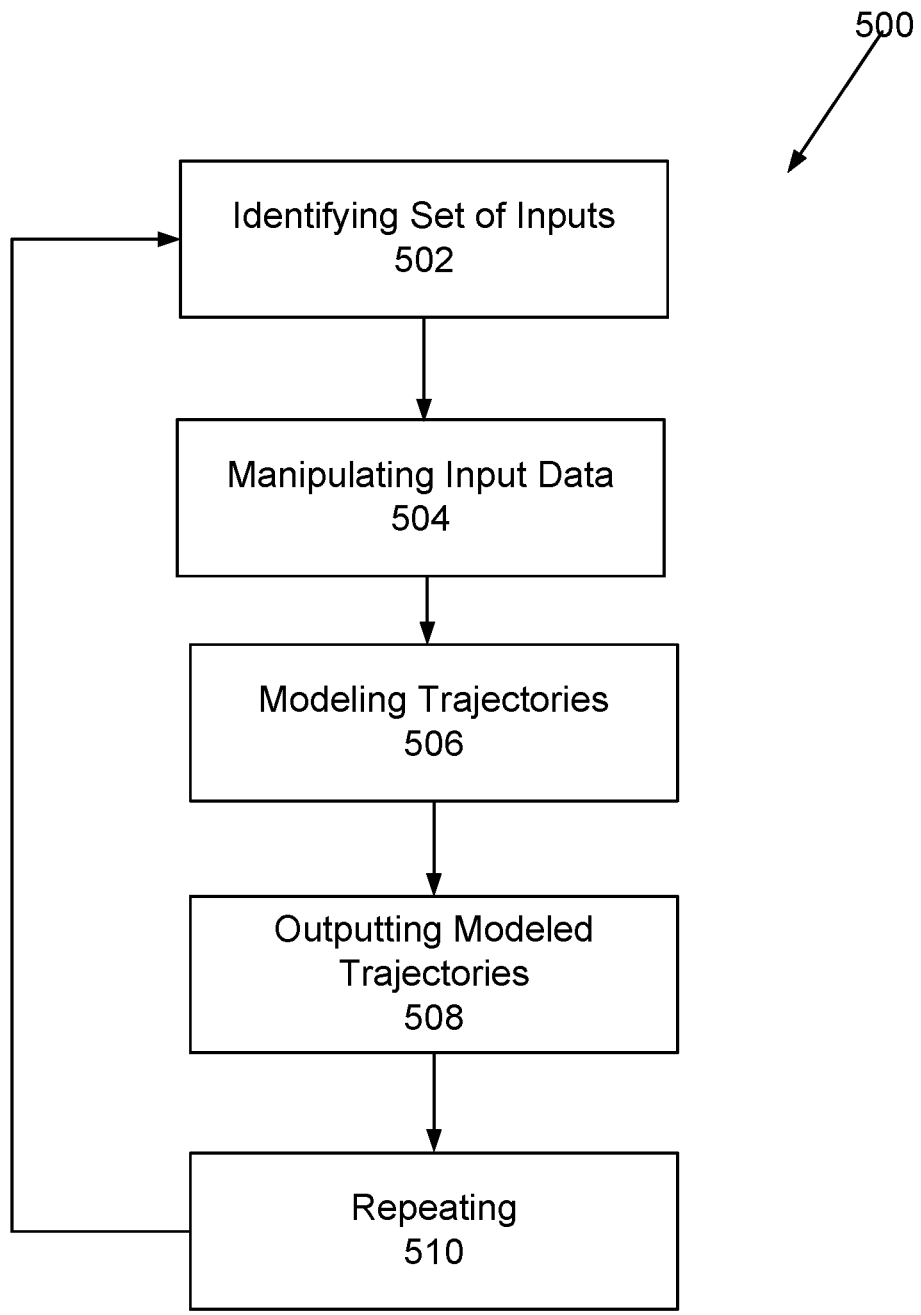
FIG. 13 is a schematic representation of another method according to the present invention.
Figure 14:
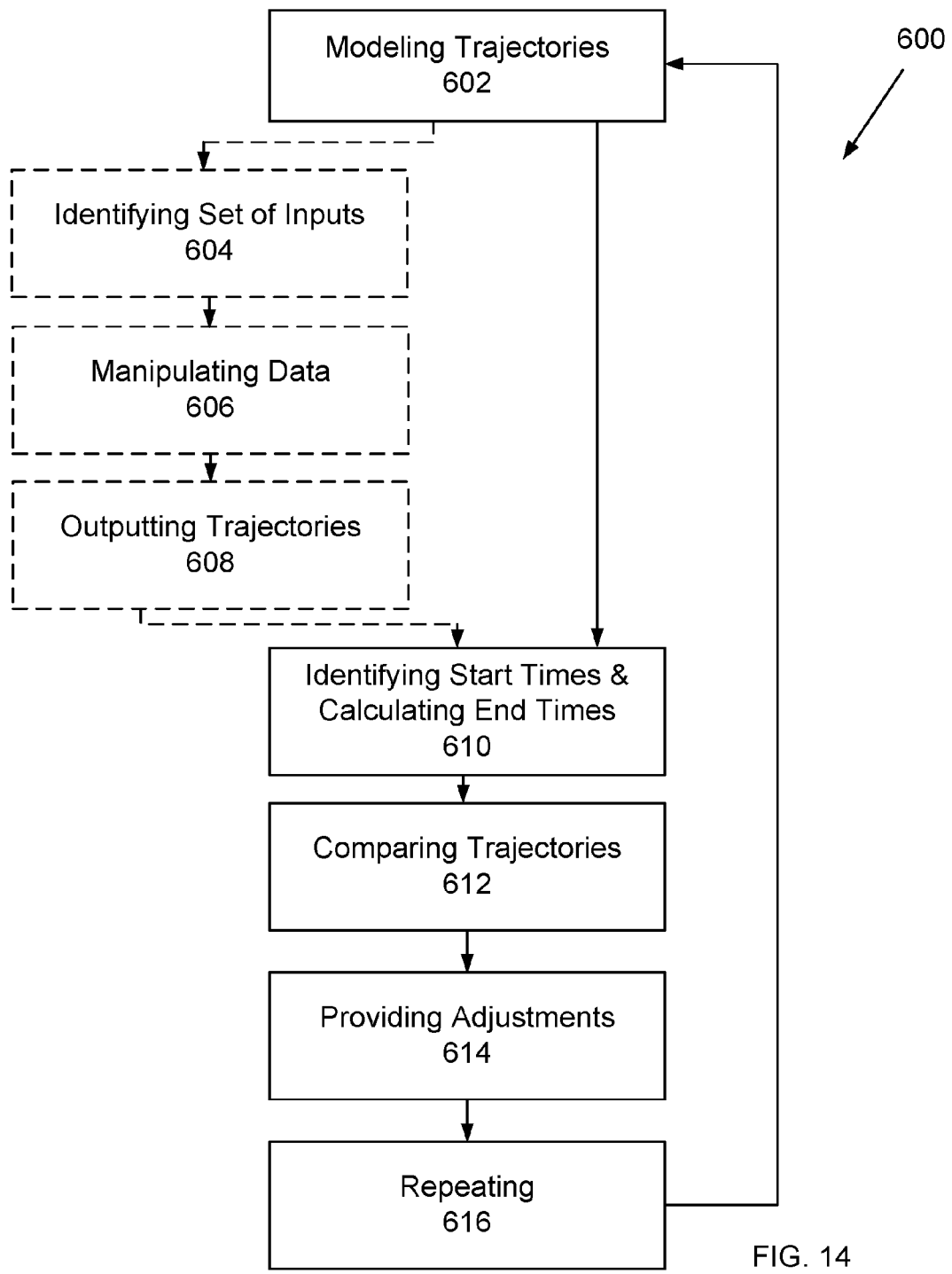
FIG. 14 is a schematic representation of yet another method according to the present invention.

Turning now to FIGS. 12-14, the invention further includes various embodiments of a method of assisting air traffic control personnel in managing a plurality of aircraft airborne within a predefined airspace within a predefined range of time. The method may be carried out at least in part by a processor for executing processor-executable instructions of an airspace management software program, a computer-readable medium capable of storing thereon the airspace management software program, and the airspace management software program including the processor-executable instructions.

The embodiment may be best appreciated with reference to the flow diagrams of FIGS. 12-14, which for purposes of simplicity of explanation are shown and described as a series of steps represented by blocks. The method embodiments are not limited by the order of the blocks, as some blocks can occur in different orders or concurrently with other blocks from that shown or described, such as in parallel or in series with other blocks. Moreover, less than all the illustrated blocks may be required to implement an example embodiment of the method. Furthermore, additional or alternative method embodiments can employ additional, non-illustrated blocks.

Turning first to FIG. 12, in one embodiment the method 400 includes the step of modelling and outputting a trajectory through the predefined airspace for each aircraft of a set of departing aircraft (block 402). Each trajectory is defined between the surface of the predefined airspace and a fix on a periphery of the predefined airspace. The set of departing aircraft include a plurality of aircraft departing from the surface of the predefined airspace within the predefined range of time. The plurality may include some or all aircraft departing during the predefined range of time.

The method 400 further includes the steps of identifying an input off-ground time of at least two departing aircraft of the set of departing aircraft along the respective trajectories (block 404) and calculating a modeled fix crossing time of the at least two departing aircraft of the set of departing aircraft along the respective trajectories (block 406). The method 400 further includes the step of comparing the modeled trajectories of the at least two departing aircraft at the respective input off-ground times and modeled fix crossing times (block 408). Where a predefined required separation time or distance between the departing aircraft is not met where at least one of the at least two departing aircraft is at the respective crossing fix along its respective modeled trajectory, the method 400 may include the step of block 410. The step of block 410 includes providing a suggested or actual adjustment of the respective off-ground time of another of the at least two departing aircraft for which the required separation time or distance was not met between the at least one and the another of the at least two departing aircraft. At block 412, the previous steps of blocks 402-410 may be repeated.

Referring now to FIG. 13, another embodiment of the method is illustrated at 500. The method 500 includes the step of identifying for each aircraft of a set of aircraft a set of inputs including an input fix on a periphery of the predefined airspace and an input runway at a surface of the predefined airspace between which the respective aircraft travel, and an input horizontal flight path of the respective aircraft through the airspace (block 502). The set of aircraft includes a plurality of aircraft departing from the surface of the predefined airspace or arriving into the predefined airspace within the predefined range of time. The plurality may include some or all aircraft departing during the predefined range of time.

The method 500 further includes the steps of manipulating the set of inputs of each aircraft of the set of aircraft (block 504), modeling respective modeled trajectories for each respective aircraft in view of the respective sets of inputs, each trajectory being defined from the respective runway to the respective fix (block 506), and outputting the modeled trajectories (block 508). At block 510, the previous steps of blocks 502-508 may be repeated.

The set of inputs identified for each aircraft of the set of aircraft at block 502 may include an additional input of an aircraft type of the respective aircraft. The set of inputs identified for each aircraft of the set of aircraft may include an additional input of predetermined preferred climb or descent profile or predetermined preferred speed profile provided by a respective airline vendor managing each respective aircraft of the set of aircraft.

Turning now to FIG. 14, a further embodiment of the method is illustrated at 600. The method 600 includes the step of modeling a trajectory through the predefined airspace for each aircraft of a set of aircraft (block 602). Each trajectory is defined between a surface of the predefined airspace and a fix on a periphery of the predefined airspace. The set of aircraft includes a plurality of aircraft departing from the surface of the predefined airspace or arriving into the predefined airspace within the predefined range of time. The plurality may include some or all aircraft departing during the predefined range of time.

The modeling the trajectory step of block 602 includes sub-steps. A first sub-step (block 604) includes identifying for each aircraft of the set of aircraft a set of inputs including an input fix and an input runway at the surface between which the respective aircraft travel, and an input horizontal flight path of the respective aircraft through the airspace. Next sub-steps include manipulating the set of inputs of each aircraft of the set of aircraft to provide modeled trajectories for each respective aircraft (block 606), and outputting the modeled trajectories (block 608).

The method 600 further includes the step of identifying an input start time of at least two aircraft of the set of aircraft along the respective trajectories and calculating a modeled end time of the at least two aircraft of the set of aircraft along the respective trajectories (block 610). Represented by block 612, another step includes comparing the modeled trajectories of the at least two aircraft at the respective input start times and modeled end times. The method 600 further includes the step of providing an adjustment, the adjustment being an adjusted modeled trajectory or adjusted input start time of one of the at least two aircraft to account for too close of a proximity of the at least two aircraft to one another at a time within the predefined range of time (block 614). The step of block 614 may only be completed where a required separation between the at least two aircraft is not met. Finally, the steps of blocks 602-614 may be repeated (block 616).

At block 604, the set of inputs identified for each aircraft of the set of aircraft may include an additional input of an aircraft type of the respective aircraft. The set of inputs identified for each aircraft of the set of aircraft may include an additional input of preferred climb or descent profile or preferred speed profile. The additional input may be a predetermined preferred input provided by a respective airline vendor managing each respective aircraft of the set of aircraft. The preferred climb or descent profile may not include a level off.

The outputting the modeled trajectories of sub-step block 608 may include where each respective modeled trajectory extends from the surface of the airspace at the respective runway to the respective fix.

The identifying an input start time of step block 610 may include identifying either an off-ground time at which the respective aircraft becomes airborne from the runway or an arrival time at which the respective aircraft enters the airspace by crossing a fix.

The providing an adjustment of step block 614 may include providing to the air traffic control personnel the adjustment as a suggestion. Where the adjustment is of a departure time, the providing an adjustment of step block 614 may include providing to the one of the at least two aircraft, absent outside input from the air traffic control personnel, the adjustment being an actual adjustment.

The comparing the modeled trajectories of step block 612 may include comparing the respective end times of at least two departing aircraft successively crossing the same respective fix. Aircraft crossing in succession may or may not have therebetween an intermediate aircraft having an intermediate crossing time. The departing aircraft are aircraft of the set of aircraft traveling from the surface of the airspace to the respective fix within the predefined range of time. Where a predefined required separation time or distance between the departing aircraft successively crossing the same fix is not met, the providing an adjustment of step block 614 may include where the adjustment is an adjusted input start time being an adjusted off-ground time at which the respective departing aircraft becomes airborne from the respective runway.

The comparing the modeled trajectories of step block 612 may include, for all departing aircraft departing from the surface of the predefined airspace within the predefined range of time, comparing the respective end times of each pair of departing aircraft successively crossing the same respective fix. With respect to step block 612, for each fix, the pairs of departing aircraft may be compared in an order of departing aircraft first crossing the respective fix to departing aircraft last crossing the respective fix within the predefined range of time. The providing an adjustment of step block 614 may include where the adjustment is an adjusted off-ground time of the departing aircraft that crosses the respective fix later or that has a later off-ground time of the respective pair of departing aircraft.

The comparing the modeled trajectories of step block 612 may include comparing respective positions of the at least two aircraft at a plurality of points along their respective trajectories. The comparing the modeled trajectories of step block 612 may include comparing the respective positions along the respective trajectories of all departing aircraft departing from the surface of the predefined airspace within the predefined range of time with all arriving aircraft crossing a fix into the predefined airspace with the predefined range of time that are jointly airborne in the airspace at the same time within the predefined range of time. An adjustment may be provided at step block 614 where a predefined required separation time or distance between the at least two aircraft is not met at respective points along their respective trajectories. Where the at least two aircraft include a departing aircraft, the providing an adjustment of step block 614 may include where the adjustment is an adjusted input start time of the departing aircraft, the departing aircraft being an aircraft of the set of aircraft traveling from the surface of the airspace to the respective fix within the predefined range of time, and the adjusted input start time being an adjusted off-ground time at which the respective departing aircraft becomes airborne from the respective runway.

The method 600 may further include the step of comparing an actual trajectory of an aircraft of the set of aircraft for which a modeled trajectory was output, with the respective modeled trajectory of the aircraft (block 618). While the step block 618 is depicted occurring after the repetition step block 616, the block 618 may occur prior to the block 616 in other embodiments. In such case, block 618 would be repeated according to block 616.

In summary, an airspace management software 18 is provided for assisting air traffic control personnel with planning and monitoring aircraft departures and arrivals with regards to one or more airspaces 10, such as a terminal airspace 10 predefined about an airport 11. Airspace output data structures 40 are generated by an algorithm 32 included in the management software 18 and coded to a non-transitory computer-readable medium 22. A system 20 for returning the airspace output data structures 40 includes the management software 18, the medium 22, and a processor 24 for executing computer code 28 of the software 18. The airspace output data structures 40 may include one or more of (a) modeled trajectories 19 based on predetermined preferences provided by airline vendors, (b) adjusted departure times for departing aircraft 21, and (c) departing or arriving trajectory adjustments. A method of assisting personnel in managing aircraft 21 includes the steps of modeling trajectories 19, comparing the trajectories 19, and adjusting departure times or trajectories 19 to resolve proximity concerns between airborne aircraft 21.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of assisting air traffic control personnel in managing a plurality of aircraft airborne within a predefined airspace within a predefined range of time, the method comprising the steps of:
    (a) modeling a trajectory through the predefined airspace for each aircraft of a set of aircraft, each trajectory being defined between a surface of the predefined airspace and a fix on a periphery of the predefined airspace, and the set of aircraft including a plurality of aircraft departing from the surface of the predefined airspace or arriving into the predefined airspace within the predefined range of time, the modeling the trajectory including
        identifying for each aircraft of the set of aircraft a set of inputs including an input fix and an input runway at the surface between which the respective aircraft travel, and an input horizontal flight path of the respective aircraft through the airspace,
        manipulating the set of inputs of each aircraft of the set of aircraft to provide modeled trajectories for each respective aircraft, and
        outputting the modeled trajectories;
    (b) identifying an input start time of at least two aircraft of the set of aircraft along the respective trajectories and calculating a modeled end time of the at least two aircraft of the set of aircraft along the respective trajectories;
    (c) comparing the modeled trajectories of the at least two aircraft at the respective input start times and modeled end times;
    (d) where a required separation between the at least two aircraft is not met, providing an adjustment, the adjustment being an adjusted modeled trajectory or adjusted input start time of one of the at least two aircraft to account for too close of a proximity of the at least two aircraft to one another at a time within the predefined range of time; and
    (e) repeating steps (a)-(d).

2. The method of claim 1, wherein the set of inputs identified for each aircraft of the set of aircraft includes an additional input of an aircraft type of the respective aircraft; and
    wherein the modeled trajectories are output to a display.

3. The method of claim 1, wherein the set of inputs identified for each aircraft of the set of aircraft includes an additional input of preferred climb or descent profile or preferred speed profile.

4. The method of claim 3, wherein the additional input is a predetermined preferred input provided by a respective airline vendor managing each respective aircraft of the set of aircraft.

5. The method of claim 3, wherein the preferred climb or descent profile does not include a level off.

6. The method of claim 1, wherein the providing an adjustment of step (d) includes providing to the air traffic control personnel the adjustment as a suggestion.

7. The method of claim 1, wherein the adjustment is of a departure time, the providing an adjustment of step (d) includes providing to the one of the at least two aircraft, absent outside input from the air traffic control personnel, the adjustment being an actual adjustment.

8. The method of claim 1, wherein the identifying an input start time of step (b) includes identifying either an off-ground time at which the respective aircraft becomes airborne from the runway or an arrival time at which the respective aircraft enters the airspace by crossing a fix.

9. The method of claim 1, wherein the outputting the modeled trajectories includes wherein each respective modeled trajectory extends from the surface of the airspace at the respective runway to the respective fix.

10. The method of claim 1,
wherein the comparing the modeled trajectories of step (c) includes comparing the respective end times of at least two departing aircraft successively crossing the same respective fix, the departing aircraft being aircraft of the set of aircraft traveling from the surface of the airspace to the respective fix within the predefined range of time, and
wherein a predefined required separation time or distance between the departing aircraft successively crossing the same fix is not met, the providing an adjustment of step (d) includes where the adjustment is an adjusted input start time being an adjusted off-ground time at which the respective departing aircraft becomes airborne from the respective runway.

11. The method of claim 10,
wherein the comparing the modeled trajectories of step (c) includes, for all departing aircraft departing from the surface of the predefined airspace within the predefined range of time, comparing the respective end times of each pair of departing aircraft successively crossing the same respective fix, and
wherein the providing an adjustment of step (d) includes where the adjustment is an adjusted off-ground time of the departing aircraft that crosses the respective fix later or that has a later off-ground time of the respective pair of departing aircraft.

12. The method of claim 10, wherein, for each fix, the pairs of departing aircraft are compared in an order of departing aircraft first crossing the respective fix to departing aircraft last crossing the respective fix within the predefined range of time.

13. The method of claim 1,
wherein the comparing the modeled trajectories of step (c) includes comparing respective positions of the at least two aircraft at a plurality of points along their respective trajectories, and
wherein an adjustment is provided where a predefined required separation time or distance between the at least two aircraft is not met at respective points along their respective trajectories.

14. The method of claim 13, wherein, where the at least two aircraft include a departing aircraft, the providing an adjustment of step (d) includes where the adjustment is an adjusted input start time of the departing aircraft, the departing aircraft being an aircraft of the set of aircraft traveling from the surface of the airspace to the respective fix within the predefined range of time, and the adjusted input start time being an adjusted off-ground time at which the respective departing aircraft becomes airborne from the respective runway.

15. The method of claim 13, the comparing the modeled trajectories of step (c) includes comparing the respective positions along the respective trajectories of all departing aircraft departing from the surface of the predefined airspace within the predefined range of time with all arriving aircraft crossing a fix into the predefined airspace with the predefined range of time that are jointly airborne in the airspace at the same time within the predefined range of time.

16. The method of claim 1, further including the step of comparing an actual trajectory of an aircraft of the set of aircraft for which a modeled trajectory was output, with the respective modeled trajectory of the aircraft.

17. A method of assisting air traffic control personnel in managing a plurality of aircraft airborne within a predefined airspace within a predefined range of time, the method comprising the steps of:
(a) identifying for each aircraft of a set of aircraft a set of inputs including an input fix on a periphery of the predefined airspace and an input runway at a surface of the predefined airspace between which the respective aircraft travel, and an input horizontal flight path of the respective aircraft through the airspace, wherein the set of aircraft includes a plurality of aircraft departing from the surface of the predefined airspace or arriving into the predefined airspace within the predefined range of time;
(b) manipulating the set of inputs of each aircraft of the set of aircraft;
(c) modeling respective trajectories for each respective aircraft in view of the respective sets of inputs, each trajectory being defined from the respective runway to the respective fix; and
(d) outputting the modeled trajectories.

18. The method of claim 17, wherein the set of inputs identified for each aircraft of the set of aircraft includes an additional input of an aircraft type of the respective aircraft.

19. The method of claim 17, wherein the set of inputs identified for each aircraft of the set of aircraft includes an additional input of predetermined preferred climb or descent profile or predetermined preferred speed profile provided by a respective airline vendor managing each respective aircraft of the set of aircraft.

20. A method of assisting air traffic control personnel in managing a plurality of aircraft airborne within a predefined airspace within a predefined range of time, the method comprising the steps of:
(a) modeling and outputting a trajectory through the predefined airspace for each aircraft of a set of departing aircraft, each trajectory being defined between the surface of the predefined airspace and a fix on a periphery of the predefined airspace, and the set of departing aircraft including a plurality of aircraft departing from the surface of the predefined airspace within the predefined range of time;

(b) identifying an input off-ground time of at least two departing aircraft of the set of departing aircraft along the respective trajectories and calculating a modeled fix crossing time of the at least two departing aircraft of the set of departing aircraft along the respective trajectories;

(c) comparing the modeled trajectories of the at least two departing aircraft at the respective input off-ground times and modeled fix crossing times;

(d) wherein a predefined required separation time or distance between the departing aircraft is not met where at least one of the at least two departing aircraft is at the respective crossing fix along its respective modeled trajectory, providing a suggested or actual adjustment of the respective off-ground time of another of the at least two departing aircraft for which the required separation time or distance was not met between the at least one and the another of the at least two departing aircraft; and (e) repeating steps (a)-(d).

21. The method of claim 1, wherein the comparing the modeled trajectories of step (c) includes comparing the respective end times of at least two departing aircraft successively crossing the same respective fix, the departing aircraft being aircraft of the set of aircraft traveling from the surface of the airspace to the respective fix within the predefined range of time.

22. The method of claim 17, further including the step of:
(e) comparing the modeled trajectories of at least two aircraft of the set of aircraft, wherein respective end times of at least two departing aircraft successively crossing the same respective fix are compared, the departing aircraft being aircraft of the set of aircraft traveling from the surface of the airspace to the respective fix within the predefined range of time.

23. The method of claim 17, wherein the modeled trajectories are output to a display.

* * * * *